(12) United States Patent
Oniki

(10) Patent No.: US 10,659,661 B2
(45) Date of Patent: May 19, 2020

(54) IMAGE PROCESSING METHOD, IMAGE PROCESSING APPARATUS, IMAGE CAPTURING APPARATUS, AND STORAGE MEDIUM

(71) Applicant: CANON KABUSHIKI KAISHA, Tokyo (JP)

(72) Inventor: Takashi Oniki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 15/942,977

(22) Filed: Apr. 2, 2018

(65) Prior Publication Data

US 2018/0295260 A1   Oct. 11, 2018

(30) Foreign Application Priority Data

Apr. 6, 2017   (JP) .................. 2017-076171

(51) Int. Cl.
| | |
|---|---|
| *H04N 5/20* | (2006.01) |
| *H04N 5/14* | (2006.01) |
| *G06T 1/20* | (2006.01) |
| *G06T 1/00* | (2006.01) |
| *H04N 5/262* | (2006.01) |
| *G06T 5/00* | (2006.01) |
| *H04N 5/357* | (2011.01) |

(52) U.S. Cl.
CPC ............ *H04N 5/20* (2013.01); *G06T 1/0007* (2013.01); *G06T 1/20* (2013.01); *G06T 5/004* (2013.01); *H04N 5/142* (2013.01); *H04N 5/2628* (2013.01); *H04N 5/35721* (2018.08); *G06T 2207/10024* (2013.01)

(58) Field of Classification Search
CPC ...... H04N 5/20; H04N 5/35721; H04N 5/142; H04N 5/2628; G06T 1/0007; G06T 1/20; G06T 5/004; G06T 2207/10024
See application file for complete search history.

(56) References Cited

U.S. PATENT DOCUMENTS

| | | | |
|---|---|---|---|
| 8,391,637 B2 | 3/2013 | Kinoshita | |
| 2015/0097993 A1* | 4/2015 | Oniki | ............... G06T 5/004 348/241 |
| 2016/0343111 A1 | 11/2016 | Oniki et al. | |

FOREIGN PATENT DOCUMENTS

| | | | |
|---|---|---|---|
| JP | 2003132351 A | 5/2003 | |
| JP | 2010081263 A | 4/2010 | |
| JP | 2016218685 A | 12/2016 | |

* cited by examiner

*Primary Examiner* — Twyler L Haskins
*Assistant Examiner* — Fayez Bhuiyan
(74) *Attorney, Agent, or Firm* — Rossi, Kimms & McDowell LLP

(57) ABSTRACT

An image processing method includes the steps of acquiring a captured image generated through image capturing using an optical system, performing first shaping processing so as to reduce a difference between a maximum value and a non-maximum value for data generated using information of a point spread function of the optical system corresponding to an image capturing condition of the captured image, performing rotating processing according to a position of the captured image for the data after the first shaping processing, and performing sharpening processing of the captured image using the data after the rotating processing.

21 Claims, 14 Drawing Sheets

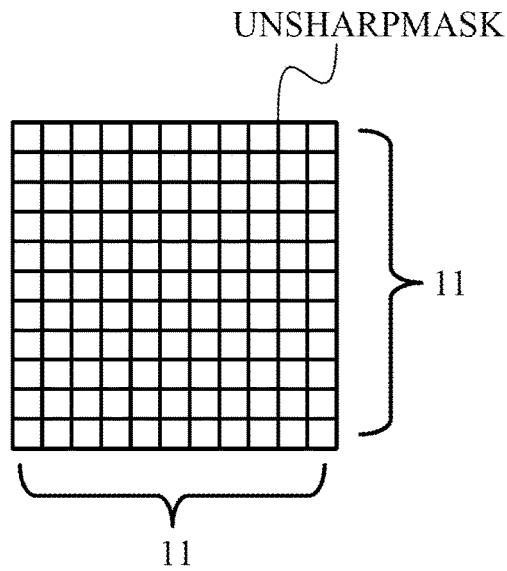
FIG. 7A
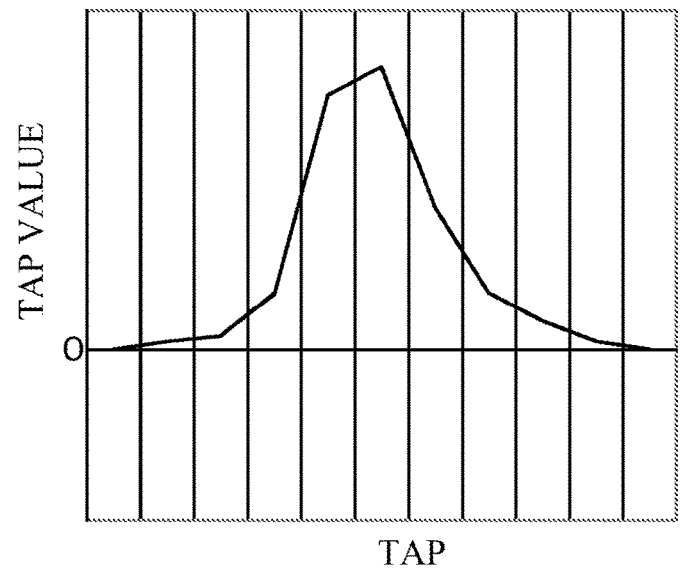
FIG. 7B
| G1 | B  | G1 | B  |
|----|----|----|----|
| R  | G2 | R  | G2 |
| G1 | B  | G1 | B  |
| R  | G2 | R  | G2 |
FIG. 8

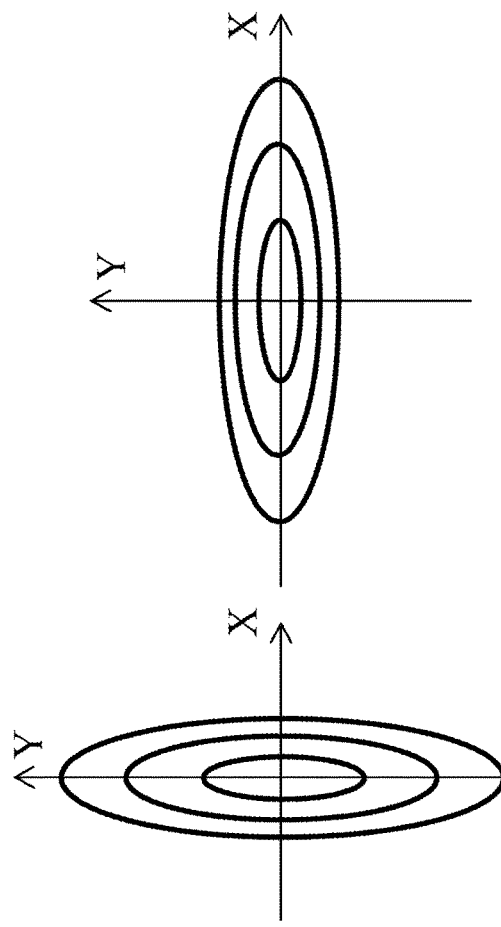
FIG. 12C
FIG. 12B
FIG. 12A
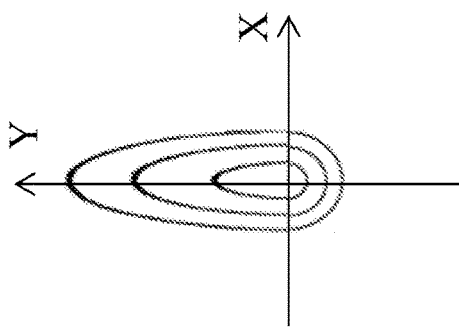
FIG. 12F
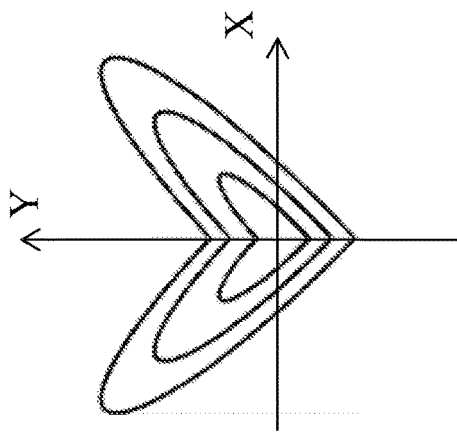
FIG. 12E
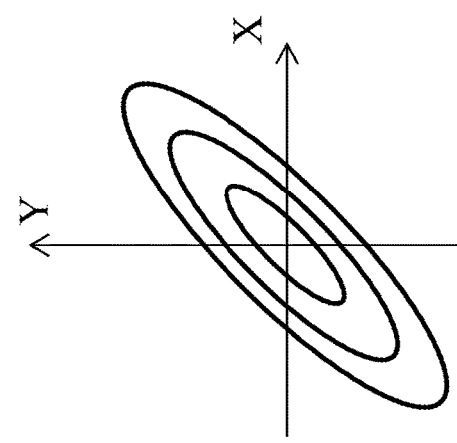
FIG. 12D

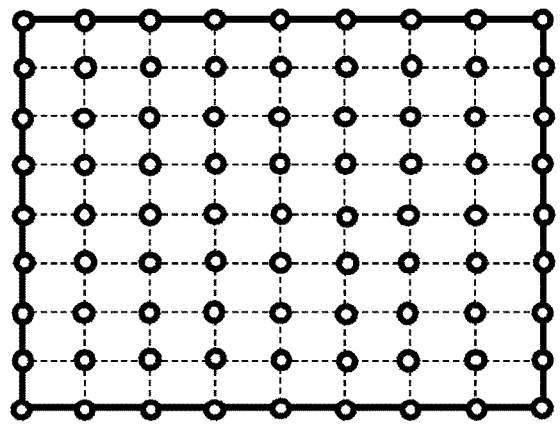
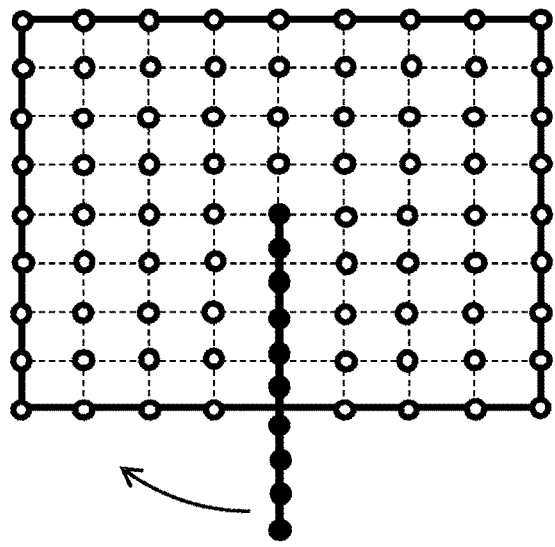
FIG. 13A  FIG. 13B
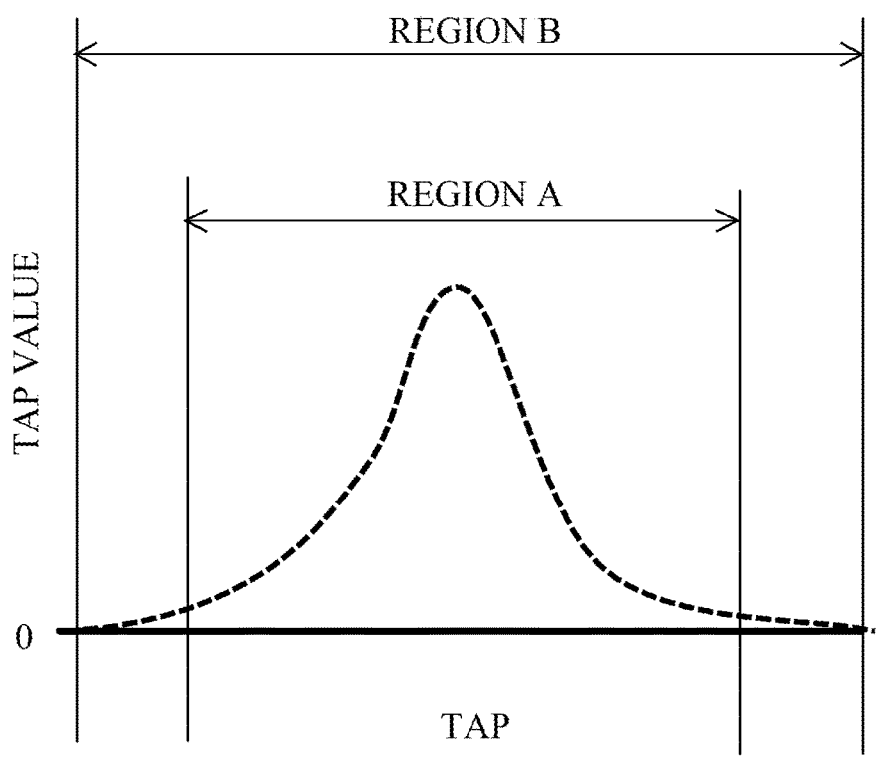
FIG. 14

IMAGE PROCESSING METHOD, IMAGE PROCESSING APPARATUS, IMAGE CAPTURING APPARATUS, AND STORAGE MEDIUM

BACKGROUND OF THE INVENTION

Field of the Invention

The present invention relates to an image processing method that provides image sharpening processing to an image.

Description of the Related Art

Known unsharp mask processing sharpens an image by adding or subtracting a difference between an original image and a blurred image obtained by applying an unsharp mask to the original image, to or from the original image. The image is further sharpened where the difference between the blurred image and the input image is large.

Japanese Patent Laid-open No. ("JP") 2010-81263 discloses a method of reducing the influence of a point spread function (PSF) of an optical system by applying an asymmetric one-dimensional filter to pixel signals arrayed in an image height direction.

The conventional unsharp mask processing uses a rotationally symmetric filter for an unsharp mask, and it is difficult to sharpen an image degraded under the influence of the intricately shaped PSF, such as the asymmetric aberration and sagittal halo. Specifically, an attempt to correct the aberration in an azimuth direction having a large aberration amount causes undershoot in an azimuth direction having a small aberration amount. On the other hand, an attempt to suppress the undershoot results in an insufficient correction of the aberration.

The method of JP 2010-81263 considers the asymmetry only in the image height direction, uses the one-dimensional correction filter, and thus cannot improve asymmetries in non-image height directions. The image height direction is a meridional azimuth direction. Moreover, the conventional method cannot sufficiently sharpen the image height direction because the asymmetry of the filter is adjusted by adjusting the number of minus tap coefficients and the correction in the image height direction is different from a blur of the PSF of the optical system. The PSF of the image capturing optical system varies according to a position in an image. Thus, accurate sharpening processing needs to apply a proper unsharp mask to each position in the image.

SUMMARY OF THE INVENTION

The present invention provides an image processing method, an image processing apparatus, an image capturing apparatus, and a storage medium which can reduce an information amount necessary for sharpening processing and produce accurate sharpening processing.

An image processing method according to one aspect of the present invention includes the steps of acquiring a captured image generated through image capturing using an optical system, performing first shaping processing so as to reduce a difference between a maximum value and a non-maximum value for data generated using information of a point spread function of the optical system corresponding to an image capturing condition of the captured image, performing rotating processing according to a position of the captured image for the data after the first shaping processing, and performing sharpening processing of the captured image using the data after the rotating processing.

An image processing apparatus according to another aspect of the present invention includes an acquirer configured to acquire a captured image generated through image capturing using an optical system, a shaping processor configured to perform first shaping processing so as to reduce a difference between a maximum value and a non-maximum value for data generated using information of a point spread function of the optical system corresponding to an image capturing condition of the captured image, a rotation processor configured to perform rotating processing according to a position of the captured image for the data after the first shaping processing, and a sharpening processor configured to perform sharpening processing of the captured image using the data after the rotating processing.

An image capturing apparatus according to another aspect of the present invention includes an image sensor configured to output image data by photoelectrically converting an object image formed via an optical system, and the above image processing apparatus.

A storage medium according to another aspect of the present invention stores a program that enables a computer to execute the above image processing method.

Further features of the present invention will become apparent from the following description of exemplary embodiments with reference to the attached drawings.

BRIEF DESCRIPTION OF THE DRAWINGS

FIGS. 7A and 7B are a schematic diagram and a schematic sectional view of an unsharp mask according to each embodiment.

FIG. 8 is a schematic diagram of a Bayer array according to each embodiment.

FIGS. 12A-12F are contour diagrams of a point spread function according to each embodiment.

FIGS. 13A and 13B are explanatory views of rotating processing of a point spread function according to each embodiment.

FIG. 14 is a sectional view of a reconstructed point spread function according to the second embodiment.

DESCRIPTION OF THE EMBODIMENTS

Referring now to the accompanying drawings, a detailed description will be given of embodiments of the present invention.

[Input Image]

An input image is a digital image (captured image) generated by using image data output from an image sensor configured to photoelectrically convert an object image (optical image) formed via an image capturing optical system (simply referred to as an "optical system" hereinafter) in an image capturing apparatus. This digital image is an image deteriorated by an optical transfer function (OTF) that contains an aberration of the optical system that includes optical elements, such as a lens and an optical filter. The image sensor includes a photoelectric conversion element, such as a CMOS sensor and a CCD sensor. The image capturing optical system may include a mirror (reflective surface) having a curvature. The optical system may be attached to and detached from (or may be replaced from) the image capturing apparatus. In this image capturing apparatus, an image capturing system includes the optical system, the image sensor, and an image processing circuit configured to generate a digital image (input image) using image data output from the image sensor.

A color component of the input image contains information, for example, of RGB color components. The color component can be used by selecting a generally used color space, such as a brightness expressed by LCH, a hue, a chroma, a luminance expressed by YCbCr, and a color difference signal. Another color space may use, for example, XYZ, Lab, Yuv, and JCh, and the color temperature may also be used.

Information on an image capturing condition (referred to as "image capturing condition information" hereinafter), such as a focal length, a F-number, an image capturing distance, and an image height of the optical system in the image capturing apparatus in generating (capturing) an input image, may be attached to an input image and an output image. Various correction information used to correct the input image may be attached to the input image and the output image. The image capturing apparatus may output the input image to an image processing apparatus separately provided to the image capturing apparatus, and the image capturing condition information and the correction information may be attached to the input image for the image processing in the image processing apparatus. The image capturing apparatus may directly or indirectly deliver the image capturing condition information and the correction information to the image processing apparatus through communications.

[Image Sharpening Processing]

Figure 3A:
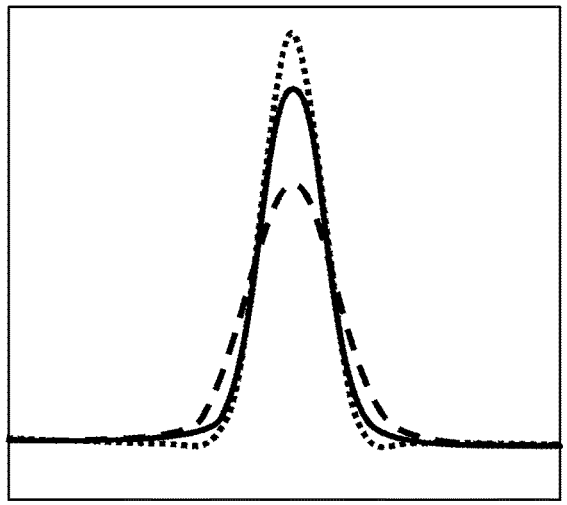
FIGS. 3A and 3B are schematic diagrams of sharpening by unsharp mask processing according to each embodiment.
Figure 3B:
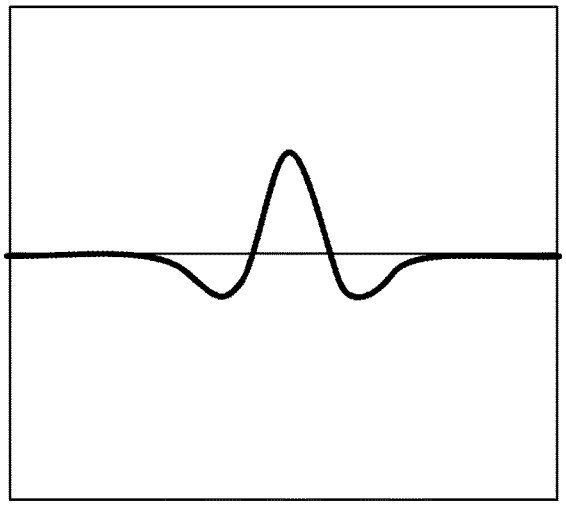

FIGS. 3A and 3B are schematic diagrams of sharpening in the unsharp mask processing (image sharpening processing) according to this embodiment. In FIG. 3A, a solid line denotes an input image, a broken line denotes an image made by blurring the input image with an unsharp mask, and a dotted line denotes a sharpened image. A solid line in FIG. 3B is a correction component. In each of FIGS. 3A and 3B, an abscissa axis denotes a coordinate, and an ordinate axis denotes a pixel value or a luminance value. FIGS. 3A and 3B correspond to a section in a predetermined direction, such as an X direction, in FIGS. 4A and 4B.

Where f(x, y) is an original image and h(x, y) is a correction component, a sharpened image g(x, y) can be represented by expression (1):

$$g(x,y)=f(x,y)+m\times h(x,y) \quad (1)$$

In the expression (1), m is an adjustment coefficient to change a correction intensity, and the adjustment coefficient m can be varied to adjust a correction amount. The adjustment coefficient m may be constant irrespective of a position in the input image or may be variable according to the position in the input image. Thereby, the correction amount can be adjusted according to the position in the input image. The adjustment coefficient m(x, y) may vary depending on the image capturing condition such as a focal length, an F-number, or an object distance in the optical system.

Where USM(x, y) is the unsharp mask, the correction component h(x, y) is expressed as follows:

$$h(x,y)=f(x,y)-f(x,y)*USM(x,y) \quad (2)$$

where USM(x, y) is, for example, a tap value at a coordinate (x, y).

The right side of the expression (2) is rewritten as below.

$$h(x,y)=f(x,y)*(\delta(x,y)-USM(x,y)) \quad (3)$$

In the expression (3), * represents a convolution (convolution integral, product sum), and symbol δ represents a delta function (ideal point image). The "delta function" is data whose number of taps is equal to that of USM(x, y) and whose value is zero except for a central value of one. The expression (3) can be expressed by modifying the expression (2), and thus the expressions (2) and (3) are equivalent with each other. For this reason, the expression (2) is used below to describe generation of the correction component.

The expression (2) calculates a difference between the captured image f(x, y) and an image obtained by unsharpening the captured image f(x, y) with the unsharp mask, and the correction component h(x, y) is generated based on this difference information. The typical unsharp mask processing uses for the unsharp mask a smoothing filter such as a Gaussian filter, a median filter, and a moving average filter.

For example, when the Gaussian filter is applied as the unsharp mask to the captured image f(x, y) illustrated with the solid line in FIG. 3A, an image obtained by unsharpening the captured image f(x, y) is illustrated with the dashed line in FIG. 3A. The correction component h(x, y) is thus the difference between the captured image f(x, y) and the unsharpened image as in the expression (2). Thus, subtracting a dashed line in FIG. 3A from a solid line in FIG. 3A yields a solid line in FIG. 3B, which represents the correction component. The correction component thus calculated is used to calculate the expression (1) so as to sharpen the input image f(x, y) illustrated with the solid line in FIG. 3A and obtain the image illustrated with the short-dotted line in FIG. 3A.

Next follows a description of image sharpening through the unsharp mask processing on an image degraded through an image capturing optical system configured to form an optical image of an object. Where I(x, y) is a pre-captured image (object image) and psf(x, y) is a point spread function PSF as a function representing a response of the optical system to a point light source, the captured image f(x, y) formed through the optical system can be expressed as follows:

$$f(x,y)=I(x,y)*psf(x,y) \quad (4)$$

If the image capturing optical system is a rotationally symmetrical coaxial optical system, a PSF corresponding to the central part in the image is rotationally symmetric. This enables the sharpening processing to make closer the captured image f(x, y) to the original image I(x, y) by applying a rotationally symmetric USM to the central part in the image. Since the correction amount is a difference value between the captured image and an unsharpened image obtained through the unsharp mask, a more accurate correction requires the use of an unsharp mask that is shaped more similarly to psf(x, y), not a simple smoothing filter. For example, when a captured image is degraded due to the spherical aberration, which has rotationally symmetric influence, a smoothing filter such as the Gaussian filter has a different distribution shape from that of the PSF affected by the spherical aberration. Thus, the use of the PSF of the optical system improves the correction in reducing the rotationally symmetric unsharpening.

This embodiment uses the PSF as the unsharp mask USM(x, y). Although the captured image f(x, y) in FIG. 3A has a symmetrical shape for convenience, the shape of the input image may not be symmetric. Even when the original image I(x, y) has an asymmetric shape, as long as a degradation function of the original image I(x, y) corresponding to psf(x, y) is rotationally symmetric, the captured image can still be sharpened with a rotationally symmetric unsharp mask.

Figure 4A:
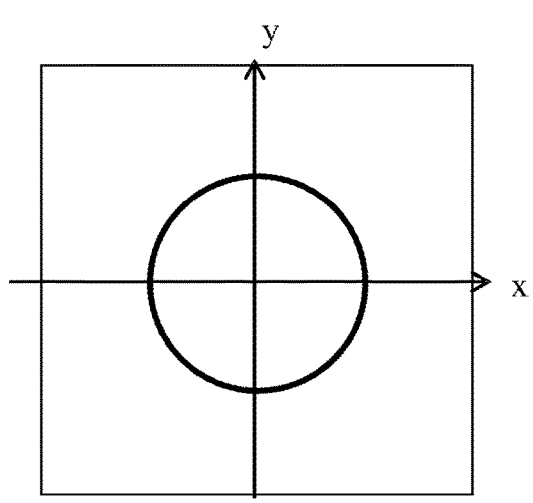
FIGS. 4A and 4B are schematic diagrams of a PSF of an image capturing optical system on an xy plane according to each embodiment.
Figure 4B:
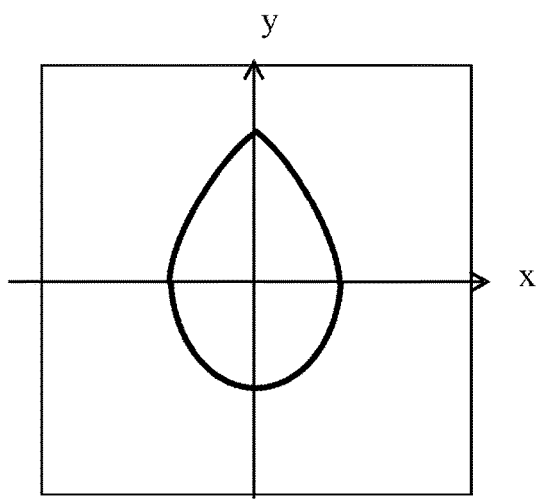

On the other hand, the PSF is usually asymmetric at positions in non-central part in the image, even when the optical system is a rotationally symmetric coaxial optical system. FIGS. 4A and 4B schematically illustrate the PSF of the optical system on the xy plane: FIG. 4A illustrates the on-axis PSF, and FIG. 4B illustrates the off-axis PSF. For example, if the original image (object) is an ideal point image, the expression (4) shows that the captured image f(x, y) is the PSF of the optical system. Assume that the ideal point image exists in an angle of view corresponding to FIG. 4B and the original image (object) is degraded due to the PSF of the optical system. Then, an image obtained as the input image is a blurred image having the shape illustrated in FIG. 4B. Next follows a description of sharpening through the unsharp mask processing on the image thus asymmetrically blurred.

Figure 5A:
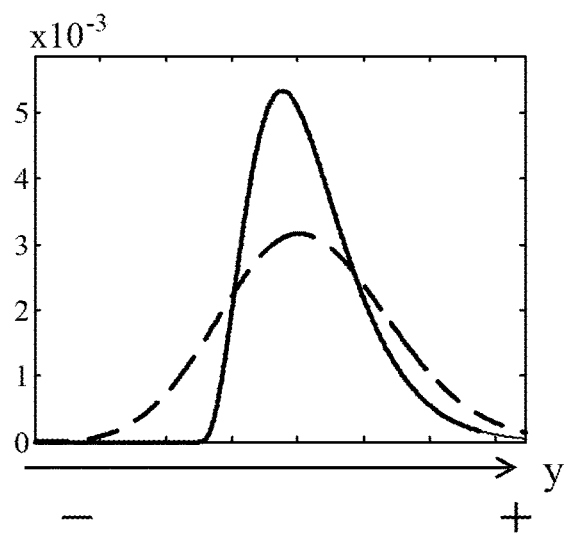
FIGS. 5A to 5C are schematic diagrams of sharpening processing with a rotationally symmetric unsharp mask according to each embodiment.
Figure 5B:
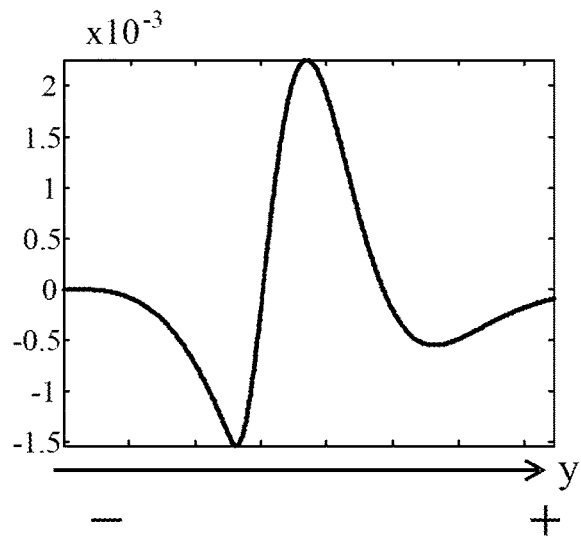
Figure 5C:
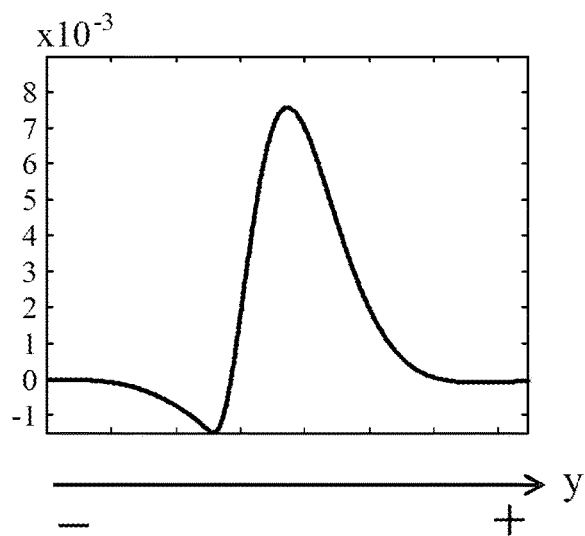
Figure 6A:
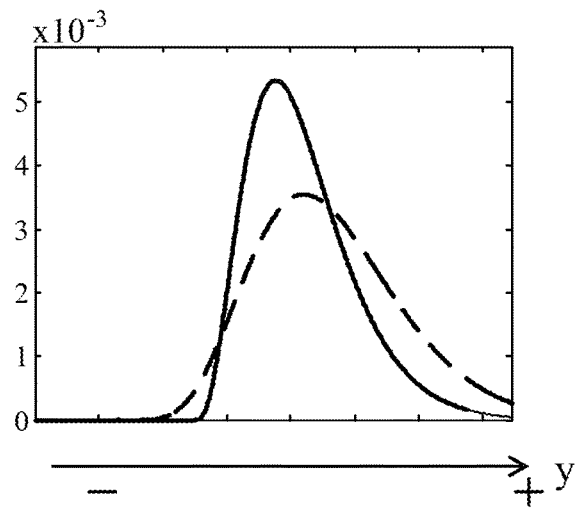
FIGS. 6A to 6C are schematic diagrams of sharpening processing with a rotationally asymmetric unsharp mask according to each embodiment.
Figure 6B:
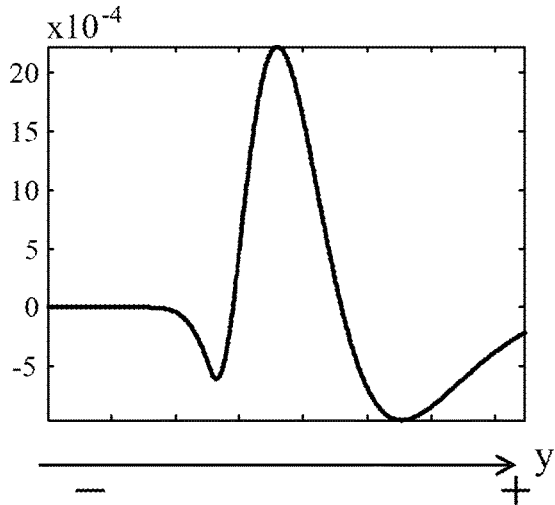
Figure 6C:
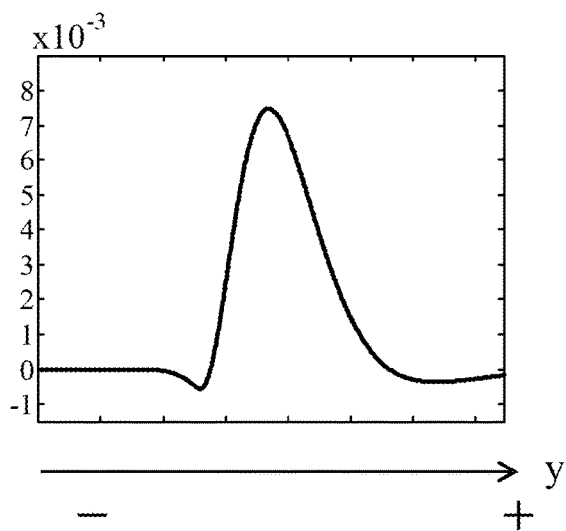

FIGS. 5A to 5C and FIGS. 6A to 6C schematically illustrate the unsharp processing to an asymmetrically degraded image. FIGS. 5A to 5C illustrate that the unsharp processing uses a rotationally symmetric unsharp mask. FIGS. 6A to 6C illustrate that the unsharp processing uses a rotationally asymmetric unsharp mask. In FIGS. 5A to 5C and 6A to 6C, the ordinate axis and the abscissa axis are the same as those in FIGS. 3A and 3B.

Solid lines in FIGS. 5A and 6A represent a section along the y direction in FIG. 4B, and dotted lines represent images obtained by blurring captured images with the respective unsharp masks. The rotationally symmetric unsharp mask in FIGS. 5A to 5C uses the Gaussian filter. The PSF of the image capturing apparatus applies the rotationally asymmetric unsharp mask in FIGS. 6A to 6C. FIGS. 5B and 6B respectively illustrate correction components as differences between the images obtained by blurring the input image with the respective unsharp masks and the original input image. For illustration convenience, in FIGS. 5A and 6A, an input image blurred by the PSF has an extended skirt on the plus side of the Y axis. In FIG. 5A, the difference between the unsharpened image and the original input image is smaller on the plus side with respect to the peak position of the solid line and larger on the minus side. Therefore, the correction component illustrated in FIG. 5B has a higher extreme value on the right side (plus side) of the central peak position than that on the left side (minus side). It is understood from a comparison between curves in FIGS. 5A and 5B that the correction component has a correction amount smaller on the plus side in the captured image and a correction amount larger on the minus side on which the skirt does not extend. Thus, the sharpening with the expression (4) cannot correct an asymmetric blur.

FIG. 5C illustrates a sharpened result where m=1. It is understood that sharpening is improved for the solid line in FIG. 5A but the minus side is significantly concave relative to the plus side and the asymmetrical blur is not successfully corrected. For example, assume that the correction amount is adjusted by changing the adjustment coefficient m in the expression (4) without changing the unsharp mask. When a large adjustment coefficient m is used to sufficiently correct the plus side of the input image, the minus side of the input image is overcorrected (undershot). In contrast, when the adjustment coefficient m is set such that the minus side of the input image is appropriately corrected, the plus side of the input image is not sufficiently corrected. This unsharp mask processing with the rotationally symmetric unsharp mask to an asymmetrically blurred input image has difficulties in improving the asymmetry and sharpening the image. The same difficulties occur when rotationally symmetric filters other than the Gaussian filter are used as the rotationally symmetric unsharp mask.

On the other hand, the difference between the unsharpened image and the original input image is larger on the plus side with respect to the peak position illustrated by the solid line in FIG. 6A and is smaller on the minus side, and this tendency is opposite to the relationship in FIG. 5A. Therefore, the correction component illustrated in FIG. 6B has a higher extreme value on the left side (minus side) with respect to the central peak position than that on the right side (plus side). When this correction component is applied to the captured image illustrated by the solid line in FIG. 6A, a large correction amount on the plus side with respect to the peak position where a large blur exists and a small correction amount on the minus side where a small blur exists. The use of the asymmetric unsharp mask thus enables the blur of the input image and the correction amount of the correction component to have similar distributions, and reduces the excess-and-insufficient correction that occurs with the use of the rotationally symmetric unsharp mask.

FIG. 6C illustrates a sharpened result where m=1. Sharpening is improved for the solid line in FIG. 6A, and a difference of a concave balance is improved between the minus side and the plus side that stand out in FIG. 5C. Moreover, this case is less likely to cause an overcorrection than the use of the rotationally symmetric unsharp mask, and thus a value of the adjustment coefficient m in the expression (4) can be set relatively large for more improved asymmetry and further sharpening. Since the correction amount of the correction component corresponds to the difference between the blurred image and the original image for more accurate corrections, a portion more blurred by the PSF of the optical system needs to be more blurred by the unsharp mask than other portions. Thus, it is ideal to use the PSF of the optical system as the unsharp mask for the more accurate corrections.

This embodiment illustrates an unsharp mask using the PSF as the image sharpening processing, but the PSF may be used for the image restoration processing represented by the Wiener filter and the image restoration processing of iterative processing represented by the RL method. The PSF can be used to generate a learned image for deep learning (DL) which has recently been developed.

[Rotating Processing]

Figure 17A:
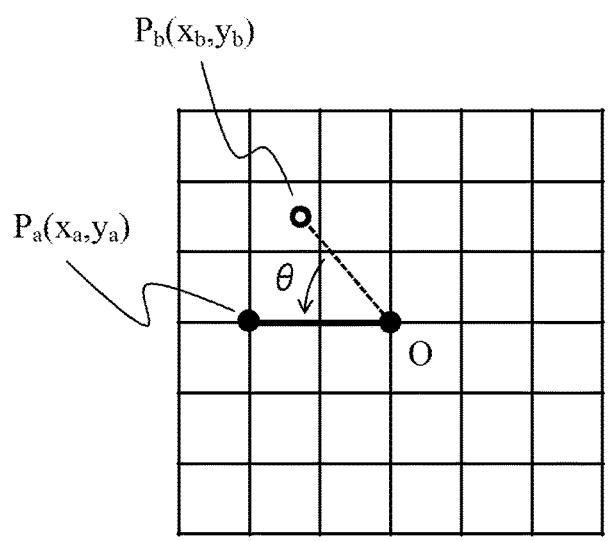
FIGS. 17A and 17B are explanatory views of rotating processing according to each embodiment.
Figure 17B:
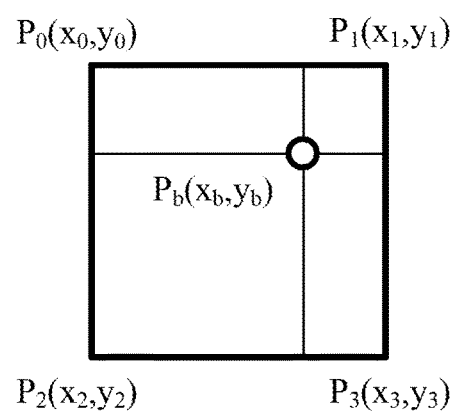

Referring now to FIGS. 17A and 17B, a description will be given of rotating processing according to this embodiment. FIGS. 17A and 17B are explanatory views of the rotating processing. FIG. 17A illustrates a coordinate after the rotating processing, in which the original data is rotated by θ counterclockwise around an origin O. Assume that $P_b(x_b, y_b)$ is a value of a point $P_b$ relative to a coordinate $(x_b, y_b)$ before the rotating processing, and $P_a(x_a, y_a)$ is a value of a point $P_a$ relative to a coordinate $(x_a, y_a)$ after the rotating processing. The coordinate $(x_b, y_b)$ can be expressed as follows with the coordinate $(x_a, y_a)$ based on FIG. 17A:

$$\begin{bmatrix} x_b \\ y_b \end{bmatrix} = \begin{bmatrix} \cos\theta & \sin\theta \\ -\sin\theta & \cos\theta \end{bmatrix} \begin{bmatrix} x_a \\ y_a \end{bmatrix} \quad (5)$$

In order to calculate $P_a(x_a, y_a)$, $P_b(x_b, y_b)$ before the corresponding rotating processing may be calculated based on FIG. 17A and the expression (5). FIG. 17B illustrates the coordinate before the rotating processing, and points $P_0$, $P_1$, $P_2$, and $P_3$ are four points near the point $P_b$. As illustrated in FIG. 17B, the coordinate $(x_b, y_b)$ of the point $P_b$ before the rotating processing does not always have integer values and thus the value $P_b(x_b, y_b)$ needs to be calculated by interpolation processing etc. This embodiment calculates $P_b(x_b, y_b)$ through linear interpolation processing with neighboring four points, as illustrated in Expression (6).

$$P(x_b, y_b) = \sum_{i=0}^{3} |(x_{3-i} - x_b)(y_{3-i} - y_b)| P_i(x_i, y_i) \quad (6)$$

$P_a(x_b, y_b)$ can be calculated by calculating $P_b(x_b, y_b)$ before the rotating processing corresponding to the coordinate $(x_b, y_b)$ through the expressions (5) and (6). Therefore, the above calculation may be calculated at all coordinates after the rotating processing in order to calculate the data after the rotating processing.

The rotating processing needs interpolation processing, and the interpolation deteriorates due to the rotating processing. As specifically detailed later, this embodiment reduces the influence of the interpolation deterioration and realizes accurate sharpening processing by performing the shaping processing for the data. The expression (6) provides a linear interpolation in order to calculate $P_b(x_b, y_b)$ but may execute other interpolation processing. A description will be given of specific embodiments.

First Embodiment

Figure 2:
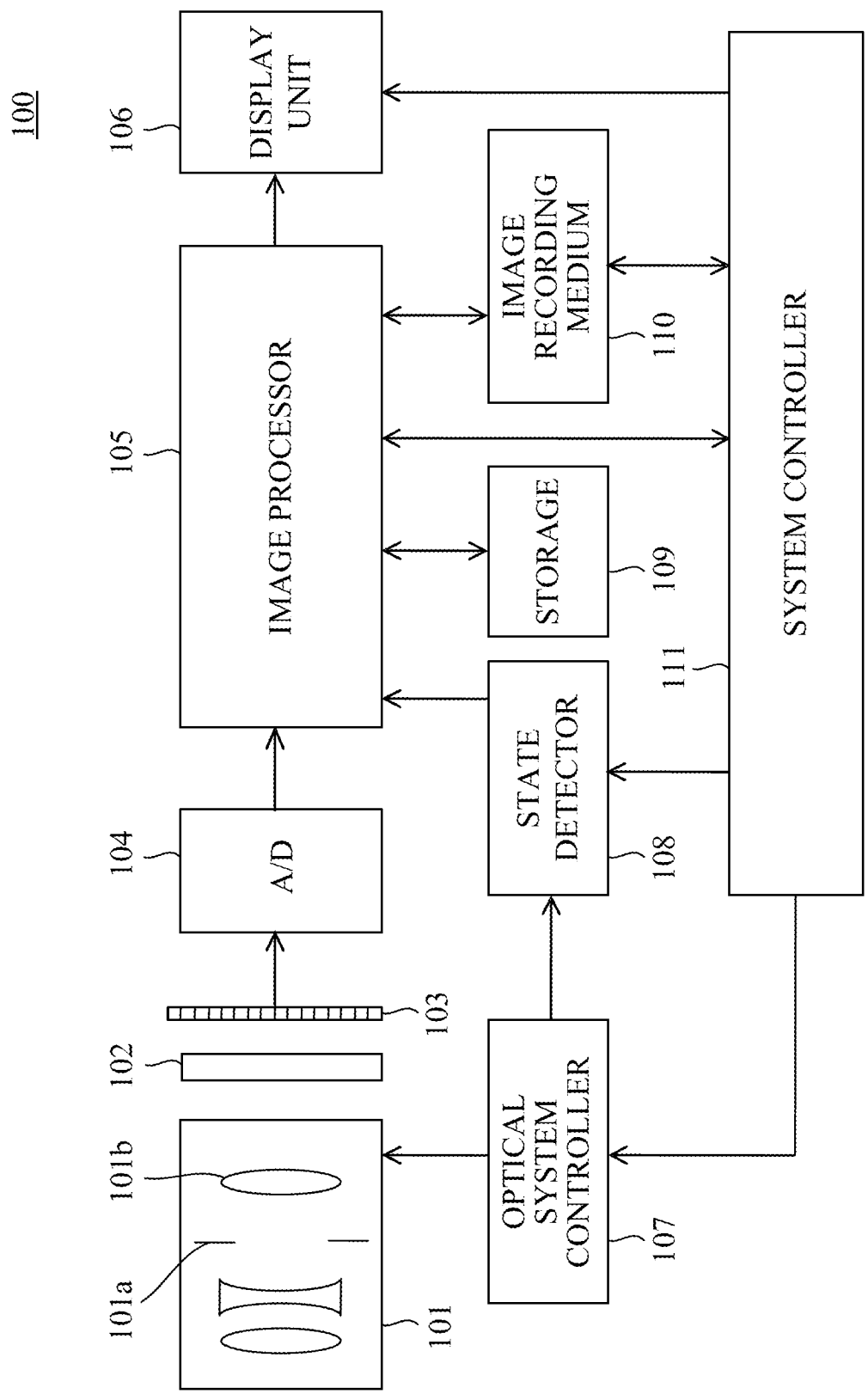
FIG. 2 is a block diagram of an image capturing apparatus according to the first and second embodiments.

Referring now to FIG. 2, a description will be given of an image capturing apparatus according to a first embodiment of the present invention. FIG. 2 is a block diagram of an image capturing apparatus 100 according to this embodiment. In the image capturing apparatus 100, a program that provides sharpening processing (an image processing method) to an input image (captured image) is installed in a storage 109, such as a ROM (memory) and a hard disk drive, and the sharpening processing is executed by an image processor 105 (image processing apparatus). Instead of the storage 109, the image processor 105 may include a storage configured to store the program of an image processing method according to this embodiment. A circuit corresponding to the program may be designed and operated for sharpening processing.

The image capturing apparatus 100 includes an image capturing optical system 101 (lens) and an image capturing apparatus body (camera body). The image capturing optical system 101 includes an aperture stop (diaphragm) 101a and a focus lens 101b, and is integrated with the image capturing apparatus body. However, this embodiment is not limited to this example and is applicable to an image capturing apparatus including an image capturing apparatus body mounted with an interchangeable image capturing optical system 101.

An image sensor 103 is an image sensor such as a CCD (charge coupled device) or a CMOS (complementary metal-oxide semiconductor). The image sensor 103 photoelectrically converts an object image (optical image or imaging light) obtained through the image capturing optical system 101 and an optical low-pass filter 102 and generates an image. The object image is photoelectrically converted into an analog signal (electric signal) by the image sensor 103, and this analog signal is converted by an A/D convertor 104 into a digital signal, which is in turn input to the image processor 105.

The image processor 105 provides predetermined unsharp mask processing as well as predetermined processing to this digital signal. The sharpening processing is provided by the image processor of the image capturing apparatus in this embodiment, but may be provided by a personal computer (PC) or a dedicated apparatus serving as the image processing apparatus.

The image processor 105 acquires image capturing condition (image capturing condition information) of the image capturing apparatus 100 from a state detector 108. The image capturing condition information is information on an aperture stop, an object distance, a focal length of a zoom lens, etc. The state detector 108 acquires the image capturing condition information directly from a system controller 111, but this embodiment is not limited to this example. For example, the image capturing condition information on the image capturing optical system 101 may be acquired from an optical system controller 107.

Figure 9:
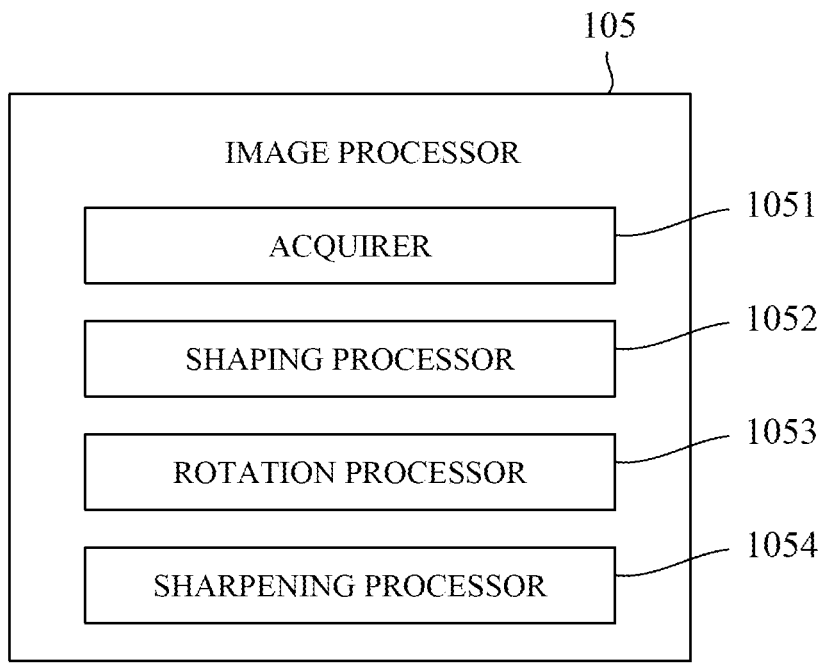
FIG. 9 is a block diagram of an image processor according to the first embodiment.

FIG. 9 is a block diagram of an image processor 105 according to this embodiment. As illustrated in FIG. 9, the image processor 105 includes an acquirer 1051, a shaping processor 1052, a rotation processor 1053, and a sharpening processor 1054, and performs image sharpening processing for an input image. The acquirer 1051 acquires a captured image (input image) generated via the optical system. The shaping processor 1052 first performs sharping processing for data generated based on information on a point spread function PSF of the optical system corresponding to the image capturing condition of the optical system so as to reduce a difference between a maximum value of the data and a value other than the maximum value (non-maximum value) (or so as to reduce the discontinuity). The rotation processor 1053 performs the rotating processing that depends on the position of the captured image for data after the first shaping processing. The sharpening processing 1054 performs sharpening processing for the captured image based on the data after the rotating processing. In this embodiment, the data has a rotationally asymmetrical distribution.

An output image processed by the image processor 105 is stored in a predetermined format in the storage 109. The storage 109 also serves as a memory that stores a relationship between the image capturing condition of the image capturing optical system 101 and the PSF of the image capturing optical system. When the image processing apparatus that executes the unsharp mask processing is provided separately from the image processor 105, the system controller 111 may store aberrational information correlated with the captured image. A display unit 106 is capable of displaying an image after the sharpening processing and predetermined display processing. The display unit 106 may display an image provided with simplified processing for fast displaying. The image recording medium 110 can store an image after the sharpening processing.

The system controller 111 controls a series of above processing. The system controller 111 may include a microcomputer or a CPU (processor). An optical system controller 107 mechanically drives the image capturing optical system 101 based on a command from the system controller 111.

The image capturing optical system 101 may include optical elements such as a low-pass filter and an infrared cut filter. When an optical element affects the PSF, such as a low-pass filter, considering the influence of the optical element in making the unsharp mask enables more highly accurate sharpening processing. When an infrared cut filter affects the PSF of each of RGB channels (RGB color components) that is an integrated value of the PSF over spectral wavelengths, especially the PSF of the R channel, the influence of the optical element may be considered in making the unsharp mask.

Figure 1:
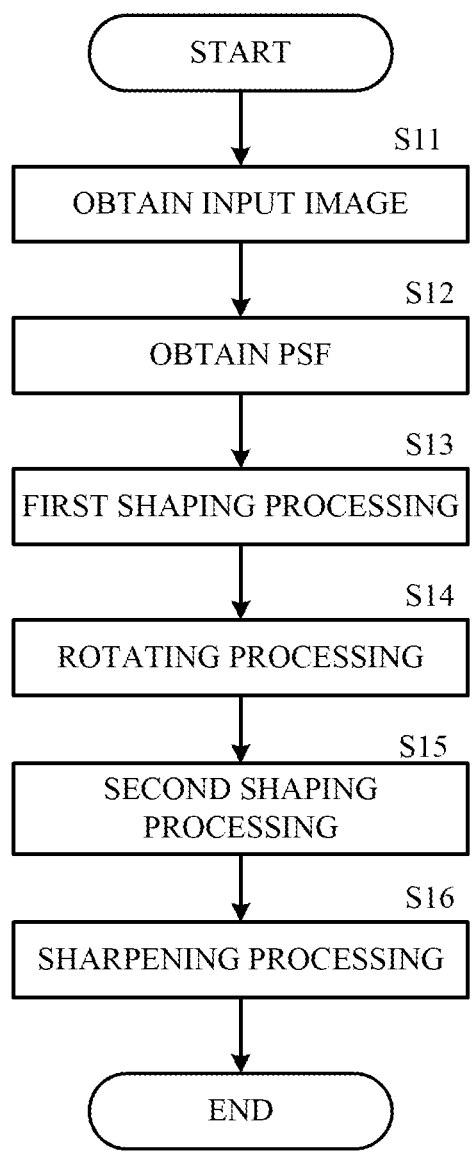
FIG. 1 is a flowchart of an image processing method according to first and third embodiments.

Referring now to FIG. 1, a description will be given of an image processing method according to this embodiment. FIG. 1 is a flowchart illustrating the image processing method according to this embodiment. The flowchart illustrated in FIG. 1 can be implemented as a program (image processing program) that enables a computer to execute the function of each step. This is true of other flowcharts in other embodiments. Each step in FIG. 1 is executed by the image processor 105 based on a command from the system controller 111.

First, in the step S11, the image processor 105 (acquirer 1051) acquires a captured image as an input image generated via the optical system. The color component data as a correction target used as the input image is, for example, G-channel image data after demosaicing. Alternatively, the R-channel image data, the B-channel image data, and all RGB-channel image data, or image data before demosaicing may be used.

FIG. 8 is a schematic diagram of a Bayer array as a discrete regular array. For example, the processing may be applied to the input image that is data of each channel of RGB or that is data of a particular channel. Alternatively, as illustrated in FIG. 8, the G channel may be divided into two or G1 and G2 so as to provide four channels in total. The configuration where the G channel is divided into two enables the image data for each of R, G1, G2, and B to have the same resolution, and facilitates image processing and data processing.

Next, in the step S12 in FIG. 1, the image processor 105 (acquirer 1051) acquires from the storage 109 the point spread unction PSF of the image capturing optical system 101 corresponding to the image capturing condition of the input image. The acquired PSF may be two-dimensional tap data, a plurality of one-dimensional tap data of the PSF component or coefficients. The two-dimensional tap data is divided into a plurality of one-dimensional tap data, for example, by using a singular value decomposition. The storage 109 records decomposed data, and acquires a plurality of one-dimensional tap data corresponding to the main components of the PSF in accordance with the image capturing condition. This embodiment uses the PSF for the unsharp mask USM, and the unsharp mask USM in the step S12 corresponds to the data in this embodiment. In other words, in this embodiment, the unsharp mask USM in the step S12 is data (approximated based on the PSF information) generated based on the information of the point spread function PSF of the optical system corresponding to the image capturing condition of the optical system.

Next follows a description of the unsharp mask USM with reference to FIGS. 7A and 7B. FIG. 7A is a schematic view of the unsharp mask, and FIG. 7B is a schematic sectional view of the unsharp mask. The number of taps for the unsharp mask is determined depending on the aberration characteristics of the image capturing optical system and the required sharpening accuracy. The unsharp mask USM illustrated in FIG. 7A is, for example, a mask having 11×11 taps. FIG. 7A omits a value (filter coefficient) in each tap, and FIG. 7B illustrates one section of the unsharp mask. In FIG. 7B, the solid line represents the section of the unsharp mask USM, the abscissa axis represents the tap, and the ordinate axis represents the tap value. An ideal distribution of a signal value (PSF of the image capturing optical system) that spreads due to the aberration is a distribution of each tap value (coefficient value) of the unsharp mask USM.

Next, in the step S13, the image processor 105 (shaping processor 1052) performs shaping processing (first shaping processing) for the unsharp mask USM obtained in the step S12. The shaping process executed in the step S13 is a pre-process configured to reduce the influence of the deterioration (interpolation deterioration) caused by the rotating processing executed in the step S14.

Figure 18A:
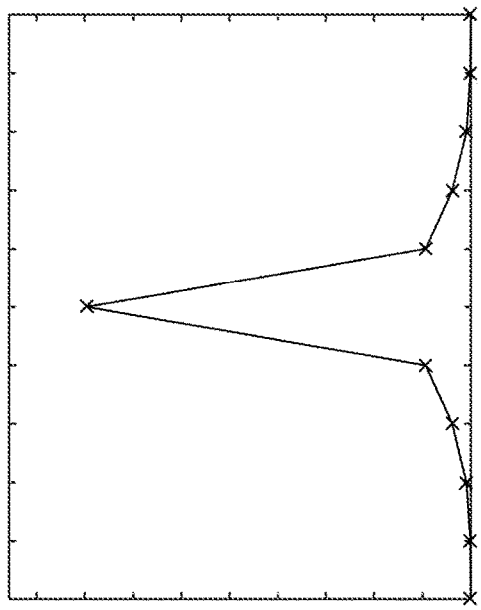
FIGS. 18A to 18D are explanatory views of an interpolation degradation associated with the rotating processing according to each embodiment.
Figure 18B:
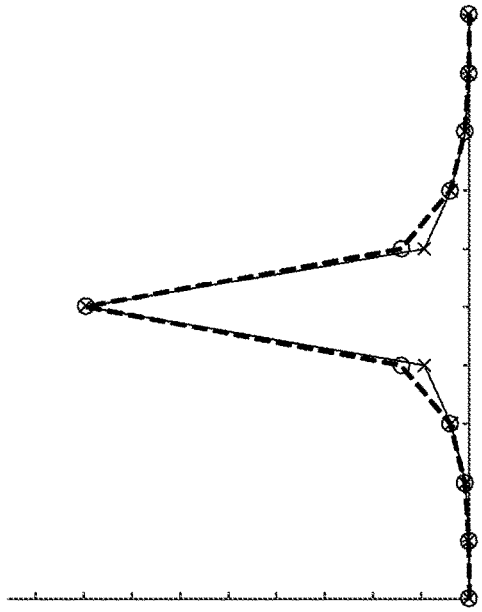
Figure 18C:
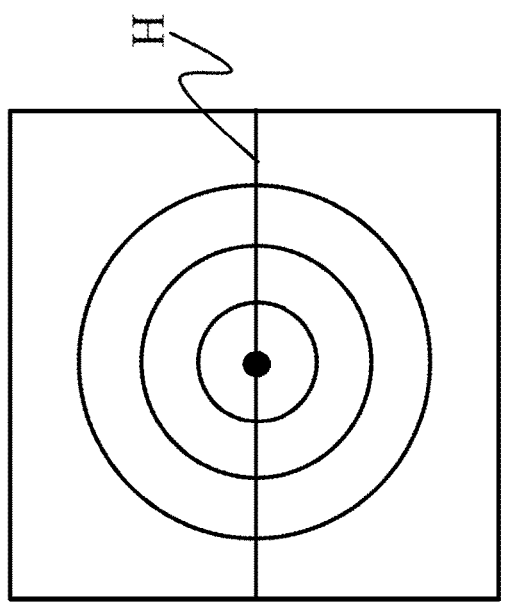
Figure 18D:
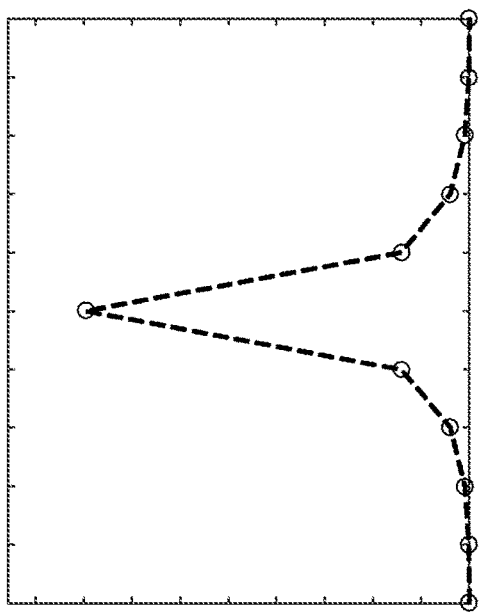

Referring now to FIGS. 18A to 18D, a description will be given of the interpolation deterioration associated with the rotating process. FIGS. 18A to 18D are explanatory views of the interpolation deterioration associated with the rotating processing. FIG. 18A is a schematic diagram of the unsharp mask USM generated from the rotationally symmetrical PSF. FIG. 18B is a profile on a section H in FIG. 18A. FIG. 18C illustrates a profile of the section corresponding to the section H in FIG. 18A after the unsharp mask USM is rotated counterclockwise by π/4. FIG. 18D is a graph that displays the profiles of FIGS. 18B and 18C in a superimposition manner.

When the unsharp mask USM is rotationally symmetrical as illustrated in FIG. 18A, the section does not change on any angled sections. Hence, ideally, the section after the rotating processing accords with the original section. The discordance of the profile is caused by the influence of the interpolation processing associated with the rotating process. As described above, the coordinate before the rotating processing corresponding to the coordinate after the rotating processing does not usually an integral value, and the interpolation processing may be used for the calculation. This embodiment uses the expression (6) as the interpolation processing. This interpolation processing increases the influence of the interpolation deterioration, as the distribution changes increases or in an area having a larger discontinuous distribution. In particular, when the PSF of the image capturing optical system is used as the unsharp mask USM, the influence changes abruptly near the distribution peak position. Even in FIG. 18D, before and after the rotation, it is confirmed that and a coefficient value adjacent to the peak position change most significantly. Since the coefficient value adjacent to the peak position change significantly in FIG. 18D, the adjacent coefficient value is drawn by the peak position and larger than the original value after the rotating processing. As the adjacent coefficient value becomes larger, the PSF distribution and the distribution spread are larger than original ones. Then, the distribution is different from the original one causing a problem, such as undershoot, even when the correction processing is performed with this unsharp mask USM.

Figure 19A:
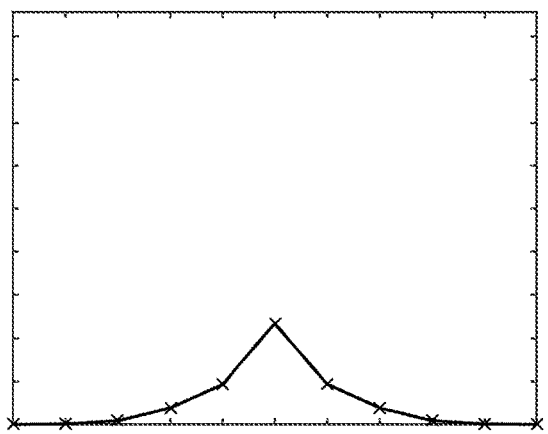
FIGS. 19A to 19C are explanatory views of first shaping processing according to each embodiment.
Figure 19B:
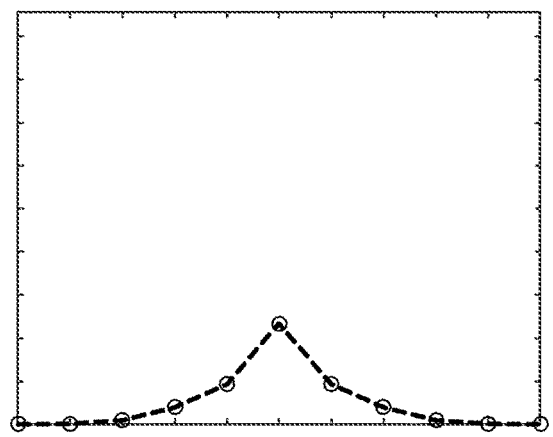
Figure 19C:
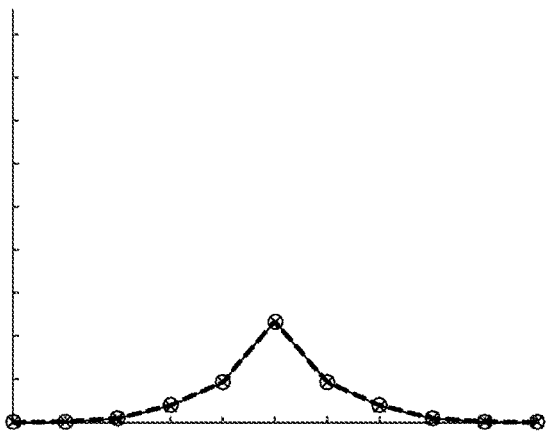

Referring now to FIGS. 19A to 19C, a description will be given of first shaping processing according to this embodiment. FIGS. 19A to 19C are explanatory views of the first shaping processing. FIG. 19A illustrates a section (profile) of the unsharp mask USM after the shaping processing is performed for FIG. 18B by the shaping processing 1052. FIG. 19B illustrates a section (profile) after the rotating processing. FIG. 19C is a graph that illustrates the sections of FIGS. 19A and 19B simultaneously in a superimposition manner.

The shaping processing (first shaping processing) executed in the step S13 shapes the distribution, as illustrated in FIG. 19A, such that a variation amount reduces (the discontinuity reduces) between the peak value (maximum value) and the coefficient value (the non-maximum value) adjacent to the peak value. Basically, the PSF of the image capturing optical system has a distribution with a large kurtosis and thus the shaping is performed so as to reduce the peak value relative to the original distribution. In FIG. 19A, the shaping processing is performed for the peak value (maximum value) that changes most significantly in comparison with the periphery, and the peak value and the coefficient value adjacent to the peak value are averaged and the average value is replaced with the original peak value. In FIG. 19A, the peak value and the adjacent coefficient value are averaged, but averaging may be made for a broader range for the rewriting processing or the median or the mode may be used instead of the average value. Alternatively, a peak value may be clipped by previously setting a threshold, and a similar effect may be obtained as long as the discontinuity is reduced for the original distribution. Where the coefficient value in data abruptly changes so as to go down from the periphery, the sharping processing may be performed for that coefficient value. The sharping processing may be performed for both the maximum value and the non-maximum value. Thus, the shaping processor 1052 performs the first sharping processing (so as to reduce the discontinuity) so as to reduce a difference between the maximum value and the non-maximum value of the data generated based on the information of the point spread function of the optical system corresponding to the image capturing condition of the optical system. The information of the point spread function of the optical system corresponding to the image capturing condition may be the approximated or exact point spread function.

Next, in the step S14 in FIG. 1, the image processor 105 (rotation processor 1053) generates the unsharp mask USM according to a position (image height) in the input image based on the unsharp mask USM (point spread function PSF) shaped in the step S13. In other words, the rotation processor 1053 performs rotating processing for the data after the first shaping processing depending on the position of the captured image.

FIG. 13A illustrates a relationship between the position of the generated unsharp mask and the input image. A white dot illustrates a position of the generated unsharp mask. The input image is divided as illustrated in FIG. 13A, and an unsharp mask is generated at eighty-one points. Then, the interpolation processing is performed for the unsharp mask, and thereby the unsharp mask can be generated at an arbitrary position in the input image so as to handle with the image height change of the PSF. Herein, the number of divisions is 9×9 in FIG. 13A, but may be smaller for the lightweight purposes or larger for the accuracy purposes. Each point of the white dot in FIG. 13A may be generated through the interpolation rather than acquiring the direct PSF.

FIG. 13B illustrates one example, and the unsharp mask is generated by the interpolation at each point. A black dot in FIG. 13B illustrates the unsharp mask to be generated in the step S14. In general, the PSF of the image capturing optical system can be rotationally symmetrical and thus the unsharp mask is also rotationally symmetrical. By using this characteristic, the example in FIG. 13B generates unsharp masks at ten points from the image center in the down direction, and the unsharp mask through the interpolation at a position corresponding to each white dot by rotating them around the image center. Thereby, it is unnecessary to produce the unsharp mask one by one at each point in the input image, and thus the processing load can reduce.

In FIG. 18D, a solid line and a crossed mark illustrate the unsharp mask before the rotating processing, and a broken line and a circle mark illustrate the unsharp mask after the rotating processing. As described above, when the rotating processing is performed without a pre-adjustment etc., a value near the coefficient value having a large change is larger than the original value due to the interpolation deterioration, as illustrated in FIG. 18D.

In FIG. 19C, a solid line and a crossed mark illustrate the unsharp mask after the shaping processing in the step S13, and a broken line and a circle mark illustrate the unsharp mask after the shaping processing and the rotating processing. In FIG. 19C, two sections (profiles) approximately overlap each other, and it is understood that the influence of the interpolation deterioration associated with the rotating processing can be reduced.

FIGS. 18A to 18D and 19A to 19C (also FIGS. 20A and 20B which will be described later) explain the rotationally symmetrical PSF but the unsharp mask USM generated based on the rotationally asymmetrical PSF can provide similar effects. The unsharp mask USM is changed at a position where the coefficient value changes significantly due to the interpolation processing illustrated in FIG. 18D. Therefore, a similar problem occurs even with the rotationally asymmetrical PSF. Thus, the influence of the interpolation deterioration associated with the rotating processing can be reduced by performing the shaping processing in the steps S13 and S15 for the coefficient value having a large change.

Next, in the step S15, the shaping processing 1052 executes a shaping process for the unsharp mask after the rotating processing (second shaping processing). In other words, the shaping processor 1052 performs the second shaping processing so as to increase a difference between the maximum value and the non-maximum value of the data after the rotating processing.

This embodiment adjusts the peak value (maximum value) of the unsharp mask USM in the step S13 in order to reduce the interpolation deterioration associated with the rotating processing executed by the step S14. Thus, the unsharp mask USM after the rotating processing generated in the step S14 has a peak value that shifts from the original peak value due to the adjustment. The step S15 is a post-process that (adjusts the data coefficient after the first shaping processing) adjusts this shift (shift amount) of the peak value. In other words, the shaping processor 1052 provides an adjustment so as to move the peak value adjusted in the step S13 to the original value. USM(x, y) expressed in the expressions (2) and (3) needs to satisfy that the total of the coefficient value is finally 1. Thus, once the coefficient value other than the peak value is determined, the peak value can be calculated based on this restraint condition. This embodiment calculates a total value other than the peak value for the unsharp mask USM after the rotating processing, and adjusts the peak value (maximum value) so that the total of the coefficient value is 1. Alternatively, the non-maximum value may be adjusted or both the maximum value and the non-maximum value may be adjusted. In this embodiment, the second shaping processing is not indispensable and the sharpening processing which will be described later may be performed with the data after the rotation processing of the step S14.

Figure 20A:
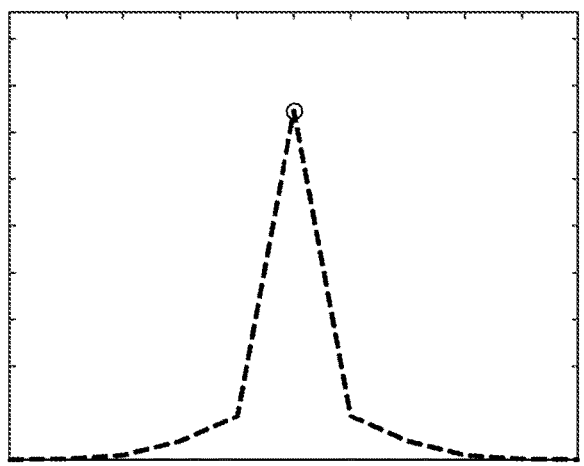
FIGS. 20A and 20B are explanatory views of second shaping processing according to each embodiment.
Figure 20B:
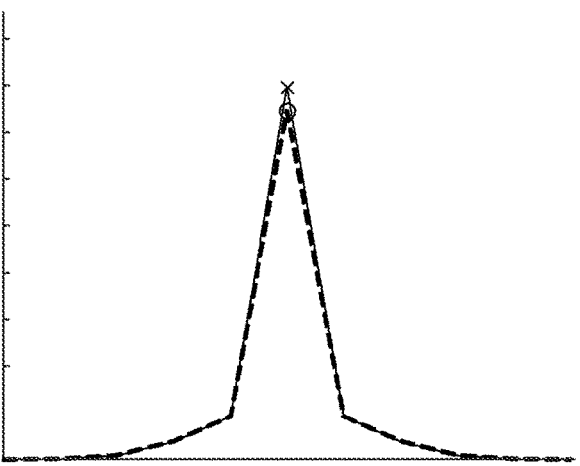

Referring now to FIGS. 20A and 20B, a description will now be given of second shaping processing according to this embodiment. FIGS. 20A and 20B are explanatory views of the second shaping processing. FIG. 20A illustrates a section (profile) of the unsharp mask USM adjusted by the shaping processor 1052 in the step S15, and FIG. 20B is a graph that illustrates both the sections (profiles) in FIGS. 20A and 18B in a superimposition manner. As clarified in FIG. 20B, the two sections (profiles) approximately accord with each other, and the two shaping processes (first shaping processing and the second shaping processing) by the shaping processor 1052 can reduce the influence of the interpolation deterioration associated with the rotating processing. It is understood based on FIG. 18D that changes in the coefficient values adjacent to the peak value approximately accord with each other in FIG. 20B.

Next, in the step S16, the image processor 105 (sharpening processor 1054) executes sharpening processing for the captured image with the unsharp mask USM (the data after the second shaping processing) shaped in the step S15. This embodiment uses the PSF of the image capturing optical system for the unsharp mask USM, and thus can accurately correct and sharpen the input image even when the image is deteriorated by the asymmetrical PSF of the image capturing optical system as seen in the periphery of the input image.

The image g(x, y) after the sharpening processing can be expressed as in the following expressions (7), (8), and (9) based on the expression (1) and (3).

$$g(x,y)=f(x,y)+m\times\{f(x,y)-f(x,y)*USM(x,y)\} \quad (7)$$

$$g(x,y)=f(x,y)+m\times f(x,y)*\{\delta(x,y)-USM(x,y)\} \quad (8)$$

$$g(x,y)=f(x,y)*\{\delta(x,y)+m\times(\delta(x,y)-USM(x,y))\} \quad (9)$$

A brace in the expression (9) will be referred to as a sharpening filter for convenience. The sharpening filter can be generated with the unsharp mask USM and the adjustment coefficient m. The adjustment coefficient m is determined based on the overcorrection and the insufficient correction of the sharpening and the noises in the image. In the step S16, the sharpening processor 1054 executes the sharpening processing for the input image based on the expression (9) and the unsharp mask shaped in the step S15.

This embodiment discretely maintains the unsharp mask USM for the input image as illustrated in FIG. 13A. The corresponding unsharp mask USM or sharpening filter is necessary for sharpening processing at the position other than the white dot in FIG. 13A. This embodiment can perform the sharpening processing at an arbitrary position through a linear interpolation to the discretely generated unsharp mask USM. More specifically, the unsharp mask USM corresponding to a certain position is generated through a linear interpolation of the unsharp masks at four white dots near the certain point, and the sharpening processing is executed based on the expression (9). This configuration can provide the sharpening processing at an arbitrary position in the image, the continuously changing sharpening effect in the image, and a naturally sharpened image. The linear interpolation may be performed by the sharpening filter instead of the unsharp mask USM.

This embodiment explains the sharpening processing based on the expression (9), but may perform the sharpening processing using the expression (7) or the expression (8) so as to provide similar effects. The expression (7) or (8) adds a correction component to the input image but this expression is established where the adjustment coefficient m is positive. Where the adjustment coefficient m is negative, the correction component is subtracted from the input image. Thus, although the code of the adjustment coefficient m is different, this operation expresses the same meaning and thus any one of the operations may be used as long as the code of the adjustment coefficient is properly adjusted.

As described for the step S14, this embodiment generates the unsharp mask USM according to the position of the image based on the PSF data for ten image heights by utilizing the characteristic in which the PSF of the image capturing optical system is rotationally symmetrical with respect to the center of the image. The PSF data for eighty-one points per one image is necessary to directly generate the unsharp mask corresponding to the white dots illustrated in FIG. 13A. On the other hand, this embodiment uses the rotating processing, and generates the unsharp mask USM corresponding to the white dots illustrated in FIG. 13A based on the PSF data for ten black dots illustrated in FIG. 13B. When the difference of the PSF of the image capturing optical system according to the color component is considered, a data amount becomes a triple and the data amount saving effect improves. Thus, a data amount can be saved by generating the unsharp mask USM according to the position in the captured image by rotating the PSF of the image capturing optical system. In order to restrain the interpolation deterioration associated with the rotating processing, the shaping process is performed for the unsharp mask USM before and after the rotating processing. The shaping processing in the steps S13 and S15 can reduce the influence of the interpolation deterioration, save a storage data amount necessary for the correction processing, and accurately sharpen the input image.

This embodiment generates the sharpened image by applying the sharpening filter generated with the unsharp mask USM shaped in the step S15, but the second shaping processing in the step S15 and the sharpening filter generation in the step S16 may be simultaneously executed. When it is assumed that k(x, y) is the sharpening filter in the expression (9), the sharpening filter k(x, y) can be modified as follows:

$$k(x, y) = \begin{cases} -mUSM(x, y) & (x \neq 0, x \neq 0) \\ (1+m)\delta(x, y) - mUSM(x, y) & (x = 0, y = 0) \end{cases} \quad (10)$$

The expression (10) provides the peak value for the adjustment where x=0 and y=0, but may set to a target the most discontinuous position relative to the periphery, which has the most changing coefficient value in USM(x, y). In generating the sharpening filter while executing the shaping processing by using the expression (10), the sharpening filter k(x, y) is previously calculated at a non-peak position. The post-process (second shaping processing) for reducing the interpolation deterioration associated with the rotating processing is executed for the coefficient value of the sharpening filter k(x, y) at the position corresponding to the peak position in USM(x, y). In other words, the coefficient value of the sharpening filter k(x, y) at the position corresponding to the peak value is not calculated with the expression (10) but is calculated based on the information of the sharpening filter k(x, y) other than the peak value. The sharpening filter k(x, y) requires the total of the coefficient values to be 1 and thus the coefficient value corresponding to the peak value can be uniquely calculated as long as the coefficient value other than the peak value is calculated.

This embodiment adjusts the peak value of the unsharp mask USM for the shaping processing, but may adjust the non-peak value. For example, the coefficient value other than the peak value of the unsharp mask USM is multiplied by $m_o$ ($m_o > 1$), a difference between the peak value and the non-peak value is relatively reduced and the discontinuity of the distribution can be reduced. This embodiment adjusts the coefficient value other than the peak value, reduces a variation amount in the unsharp mask USM for the rotating processing, and can reduce the influence of the interpolation deterioration associated with the rotating processing.

In this case, the second shaping processing executed in the step S15 divides the coefficient value by $m_o$ for the coefficient value of the unsharp mask USM other than the peak value, and then makes an adjustment using the peak value. This adjustment method of the peak value is similar to the processing described in the step S15, and may calculate the peak value so that the total of the coefficient values of the unsharp mask USM is 1. In simultaneously generating the sharpening filter with the expression (10), m may be set to $m/m_o$ in calculating the coefficient value other than the peak value. Hence, the sharping processing in the step S13 may increase the non-peak value rather than decreasing the peak value. A similar effect can be obtained by increasing the non-peak value while the peak value is decreased. Where the step S13 increases the non-peak value instead of decreasing the peak value, the sum of the unsharp mask USM may be maintained constant before and after the shaping processing by subtracting an increased amount of the non-peak value from the peak value.

While this embodiment uses the unsharp processing for the image sharpening processing, another sharpening method may be used. In this case, the unsharp mask USM is used for the PSF for each position (image height) in the image produced in the step S14 or S15. The unsharp mask USM generated in the step S14 or S15 is less affected by the interpolation deterioration associated with the rotating processing and can provide highly accurate correction processing, similar to the unsharp mask processing described in this embodiment.

Second Embodiment

Next follows a description of an image capturing apparatus according to a second embodiment of the present invention. The image capturing apparatus according to this embodiment is different from that of the first embodiment in using an image processor 205 instead of the image processor 105 and is similar to that of first embodiment in other structures.

Figure 10:
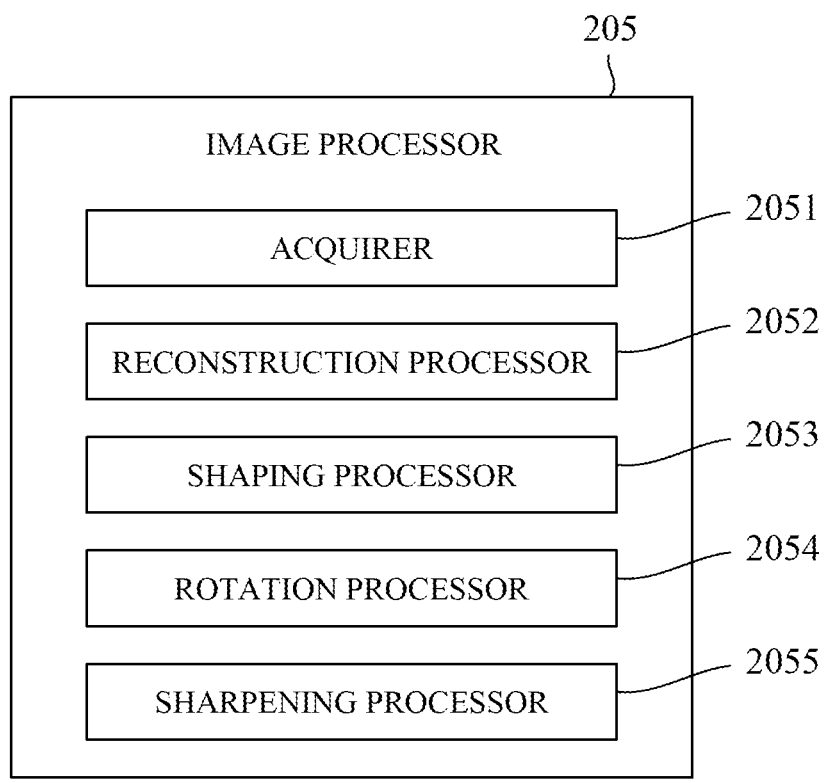
FIG. 10 is a block diagram of an image processor according to the second and third embodiments.

FIG. 10 is a block diagram of an image processor 205 (image processing apparatus). As illustrated in FIG. 10, the image processor 205 includes an acquirer 2051, a reconstruction processor 2052, a shaping processor 2053, a rotation processor 2054, and a sharpening processor 2055.

Figure 11:
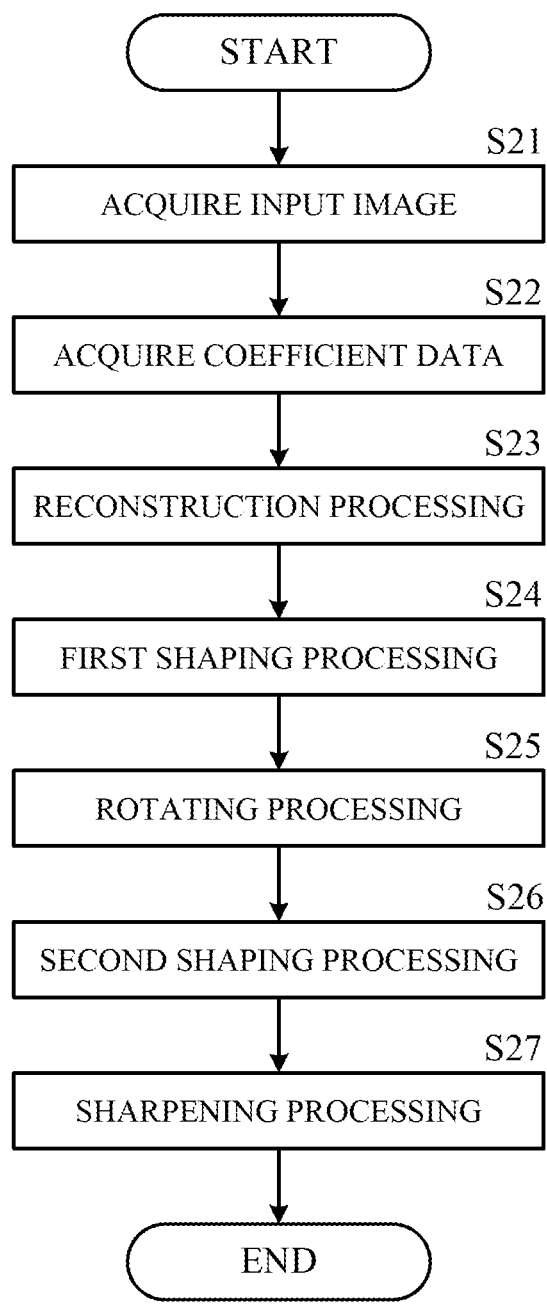
FIG. 11 is a flowchart of an image processing method according to the second embodiment.

FIG. 11 is a flowchart of an image processing method according to this embodiment. The flowchart illustrated in FIG. 11 illustrates an unsharp processing flow according to this embodiment. Even in this embodiment, in response to a command from the system controller 111, the image processor 205 executes this processing in accordance with an image processing program. This embodiment is different from the first embodiment in that the image processor 205 obtains the coefficient data for the PSF of the image capturing optical system, and reconstructs the PSF of the image capturing optical system. Other processes, such as the steps S21, S24 to S27 in FIG. 11 are similar to S11, S13 to S16 in FIG. 1, and a description thereof will be omitted.

Before concrete processing is explained for each step, a description will be given of an approximate function and coefficient data for the PSF of the image capturing optical system used for this embodiment. A description will now be given of the function used to approximate the PSF of the image capturing optical system. The field, such as the astrophysics, often utilizes the following function P(x, y) referred to as a Moffat function in fitting a photometric celestial object.

$$P(x, y) = \left(1 + \frac{x^2 + y^2}{\alpha^2}\right)^{-\beta} \tag{11}$$

Herein, $\alpha$ and $\beta$ in the expression (11) are coefficient data, and particularly referred to as a Lorentz function when $\beta = 1$. For example, when the PSF is modelled with the expression (11), the PSF distribution calculated by the measurement or calculation is fitted with the expression (10) and these coefficients are calculated. The calculated coefficients $\alpha$ and $\beta$ and the expression (11) are used to model the PSF.

The approximate PSF can be generated with the expression (11) but the expression (11) is a function that can express only a rotationally symmetrical distribution for the coordinate (x, y) and cannot produce the rotationally asymmetrical distribution. The PSF of the image capturing optical system does not always become the rotationally symmetrical distribution, and thus needs to utilize a function that can express the shape of the rotationally asymmetrical distribution.

A modified function of the expression (11) includes a function expressed by the following expression (12) referred to as an Elliptical Moffat function.

$$P(x, y) = \left[1 + \frac{1}{\alpha^2}\left(X^2 + \frac{Y^2}{\gamma^2}\right)\right]^{-\beta} \tag{12}$$

$$\begin{bmatrix} X \\ Y \end{bmatrix} = \begin{bmatrix} \cos\theta & \sin\theta \\ -\sin\theta & \cos\theta \end{bmatrix}\begin{bmatrix} x \\ y \end{bmatrix} \tag{13}$$

Herein, $\alpha$, $\beta$, and $\gamma$ in the expression (12) are coefficient data and the expression (13) is a rotation matrix with an angle $\theta$. The expressions (12) and (13) can provide the following expression (14).

$$P(x,y) = (\sigma + ax^2 + 2bxy + cy^2)^{-\beta} \tag{14}$$

In the expression (14), a, b, c, $\sigma$, and $\beta$ are coefficient data. The coefficients a, b, and c in the expression (14) need to satisfy a relationship of ($b^2 - ac < 0$), in order to maintain an elliptical shape. Thus, the expression (14) or (12) can reproduce the elliptical distribution that cannot be expressed by the expression (11). The expression (14) when used to fit the PSF of the image capturing optical system can approximate the elliptical shape and thus improve the accuracy in comparison with the expression (11) but cannot reproduce the complicated shape, such as the astigmatism and sagittal halo.

Accordingly, this embodiment uses the function expressed by the following expression (15) as a function that can reproduce the PSF having a complicated shape such as the astigmatism and sagittal halo of the image capturing optical system.

$$P(x, y) = \begin{cases} (\sigma + ax^2 + 2bxy + cy^2)^{-\beta} - e & (x \geq 0, y \geq 0) \\ (\sigma + ax^2 + 2bdxy + cd^2 y^2)^{-\beta} - e & (x \geq 0, y < 0) \\ P(-x, y) & (x < 0) \end{cases} \quad (15)$$

In the expression (15), a, b, c, d, e, σ, and β are coefficients. The coefficients a, b, and c in the expression (15) need to satisfy $b^2-ac<0$, similar to the expression (14).

FIG. 12A illustrates a rotationally symmetrical distribution for the xy coordinate, which can be expressed by any one of the expressions (11), (12), (13), (14), and (15). The image capturing optical system is a coaxial system, and the PSF is rotationally symmetrical where the image point is located on the optical axis, and the shape of the PSF distribution can be expressed by using any one of the above functions. FIGS. 12B and 12C illustrate an elliptical distribution in which major and minor axes of the ellipse overlap the x and y axes, and the expression (11) can express only a rotationally symmetrical shape. Any one of the expressions (12), (13), (14), and (15) improves the approximation accuracy of the distribution shape. FIG. 12D illustrates the elliptical distribution where major and minor axes of the ellipse are not aligned with the x and y axes. The expression (11) or (12) cannot express this distribution shape. Any one of the expressions (12), (13), (14), and (15) improves the approximation accuracy for such a distribution shape.

FIGS. 12E and 12F illustrate symmetrical distribution shapes with respect to the x axis, and any one of the functions expressed by the expressions (11), (12), (13), and (14) cannot express this line symmetrical distribution shape. On the other hand, the expression (15) used for this embodiment is made symmetrical with respect to the y axis, and can accurately approximate the distribution shapes illustrated in FIGS. 12E and 12F. As descried above, the PSF of the image capturing optical system at the image point on the optical axis has a rotationally symmetrical shape, but the PSF does not always have a rotationally symmetrical distribution at an off-axis image point on the plane (image plane) vertical to the optical axis. However, even at the off-axis image point, the PSF at the image point on the image plane in the sagittal direction vertical to the optical axis direction (meridional direction) provides a symmetrical distribution for a coaxial optical system. Since the PSF in the image capturing optical system does not always have a rotationally symmetrical distribution but is symmetrical in the sagittal direction, this embodiment can handle a complex asymmetrical aberration by aligning the x axis with the sagittal direction and the y axis with the meridional direction in the expression (15).

Next follows a detailed description of each coefficient in the expression (15). The coefficients a, b, and c among the coefficients in the expression (15) are used to generate an elliptical distribution in which the X and Y axes are not aligned with the major and minor axes as illustrated in FIG. 12D. The asymmetries in the X and Y directions in the elliptical distribution can be controlled by controlling these coefficients a, b, and c. As illustrated in FIGS. 12E and 12F, this embodiment can express an aberration, such as the sagittal halo, that is hard to express with another function.

The coefficient d is used to make the elliptical distribution asymmetrical in the Y direction (specific direction), and controlling the coefficient d can control an aberration that is asymmetrical in the meridional direction. For example, controlling the coefficient d can reduce the coma or improve the approximation accuracy.

The coefficients e, σ, and β are used to control the spread of the elliptical distribution. When the elliptical distribution to be approximated has a wide spread, the approximation accuracy can be improved by making larger the coefficient σ, and when the elliptical distribution to be approximated abruptly changes near the peak, the approximation accuracy can be improved by making larger the coefficient β. The coefficient e is used to limit the spread of the elliptical distribution. When the coefficient e is equal to 0, the elliptical distribution gradually approaches to $P(x, y)=0$ in the periphery according to the expression (15). Thus, when the elliptical distribution has a narrow spread, the approximation accuracy can be improved by setting the coefficient e larger than 0. In order to approximate the PSF of the image capturing optical system, it is necessary that the elliptical distribution satisfies $P(x, y) \geq 0$. When e is made larger than 0, the periphery satisfies $P(x, y)<0$ but $P(x, y)$ may be set to 0 through clipping.

Next follows a description of processes in the steps S22 and S23 in FIG. 11. In the step S22, the image processor 205 (acquirer 2051) acquires data of the coefficients a, b, c, d, e, σ, and β in the function (predetermined function) in the expression (15) used to reconstruct the PSF of the image capturing optical system 101 according to the image capturing condition. In order to generate an approximated PSF corresponding to the certain image point, it is not always necessary to acquire data of all of these coefficients. For example, the PSF on the optical axis has a rotationally symmetrical shape as described above with a=c, b=0, and d=1.

The coefficient β is an exponential term and causes a heavy processing load when the coefficient β is made variable according to the PSF. Thus, β may be fixed to 1. When the coefficient β is fixed, a shape range that can be expressed becomes narrower than that when the coefficient β is not fixed but a coefficient data amount stored in the memory 109 and the processing load can be reduced.

The number of coefficients may be increased in order to improve the approximation accuracy. For example, it is difficult to provide highly accurate fitting with a continuous function for the PSF having a narrowly spread distribution and a high peak, and thus the peak value or a value near the peak of the PSF may be directly set as the coefficient. The approximation accuracy can be improved by thus directly setting to the coefficient an area in which the distribution abruptly changes, and by setting the area to be reproduced with the function to another area. In the step S22, the image processor 205 (acquirer 2051) may acquire the adjustment coefficient m for the sharpening processing in addition to the coefficient data.

According to this embodiment, the image processor 205 thus acquires the coefficient data, generates the approximated PSF by using the coefficient data, and generates the unsharp mask USM corresponding to the approximated PSF.

Hence, a data amount to be stored can be much smaller while the correction accuracy is maintained than that in a case where the data corresponding to the PSF of the image capturing optical system is directly stored. For example, as illustrated in FIGS. 7A and 7B, the unsharp mask USM with 11×11 taps needs to have data of 121 tap values. In order to separately store the RGB data, a data amount becomes a triple and it is necessary to store data of 363 tap values. On the other hand, when the coefficients are stored, the expression (15) has seven coefficients or twenty-one coefficients for the RGB colors. Thus, storing the coefficient data results in saving a storage data amount.

Next, in the step S23, the image processor 205 (reconstruction processor 2052) reconstructs the PSF by using the coefficient data acquired in the step S22 (reconstruction processing). The PSF is reconstructed based on the coefficient data and the expression (15) as a function utilized to calculate the coefficient data, and this embodiment utilizes the reconstructed PSF for the unsharp mask.

FIG. 14 is a sectional view of the reconstructed point spread function PSF, and in reproducing an area A as the unsharp mask, the coefficients may be generated by fitting a little wider area B. Thereby, when a tap number and pitch are later changed through an interchangeable lens etc., a change may be made so as to widen the area.

Where the tap number, the pitch, the reconstruction accuracy and the like are previously determined, an area corresponding to the optical system or the sensor may be used for the generation. Basically, one tap size in the generated unsharp mask needs to accord with the one pixel size in the image sensor in obtaining the image and thus accords with the pixel size in the sensor when it is uniquely determined. In reconstructing the unsharp mask based on the coefficients as in this processing, when the number of coefficients is increased, the correction accuracy improves in the sharpening. Thus, the coefficient generation and reconstruction may match the required accuracy.

Figure 16A:
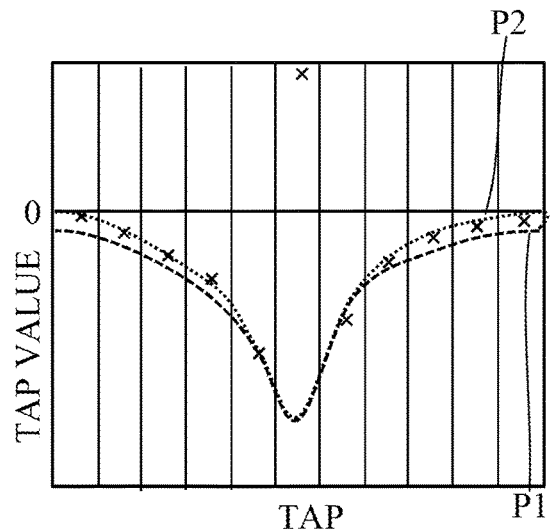
FIGS. 16A and 16B are sectional views of an adjusted sharpening filter according to the second embodiment.
Figure 16B:
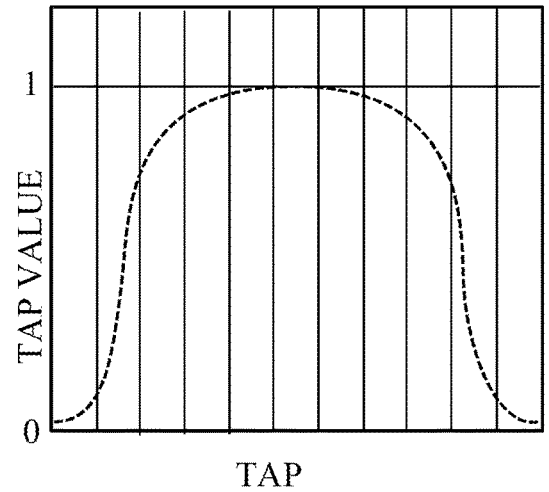

FIGS. 16A and 16B are sectional views of the adjusted sharpening filter. In order to improve the sharpening effect for the reconstructed PSF or the sharpening filter, a window function illustrated in FIG. 16B may be applied. A broken line P1 in FIG. 16A is a reconstructed PSF larger than the filter size. When the reconstructed PSF is larger than the filter size and does not approach to 0 in the periphery, a sharpening filter that is generated by discretizing the reconstructed PSF has a weak sharpening effect. More specifically, in the input image, in particular, in an area having a large contrast difference, the discontinuity influence of the filter coefficients remarkably appears and prevents the correct sharpening. This problem can be solved by increasing the tap number since this problem occurs when the tap number of the filter is small for the PSF of the image capturing optical system and peripheral information runs short. However, when the tap number is fixed or when the specification is determined, another method is necessary to handle this problem.

The other method adjusts the PSF so as to make a distribution illustrated by a dotted line P2 in FIG. 16A by multiplying the reconstructed PSF by the distribution that has 1 at the center part and continuously attenuates to 0 to the periphery, as illustrated by a broken line in FIG. 16B. The above influence can be reduced by generating the sharpening filter based on the PSF adjusted as illustrated by the dotted line P2 in FIG. 16A. The discretized PSF may be multiplied by the distribution that is illustrated by the broken line in FIG. 16B and previously stored as the discrete data.

A data amount to be stored can be further reduced by the configuration of this embodiment or by storing the approximated PSF of the image capturing optical system as the coefficients and by reconstructing the PSF in producing the unsharp mask. Similar to the first embodiment, this embodiment can accurately correct an input image deteriorated by the asymmetrical PSF and the optical low-pass filter in the image capturing optical system and provide a sharpened image.

Third Embodiment

Next follows a description of an image capturing apparatus according to a third embodiment of the present invention. This embodiment is different from the first or second embodiment in structure of the image capturing apparatus, and the image processing method of this embodiment is similar to the flowchart illustrated in FIG. 11 according to the second embodiment and only a structure of the image capturing apparatus will be described.

Figure 15:
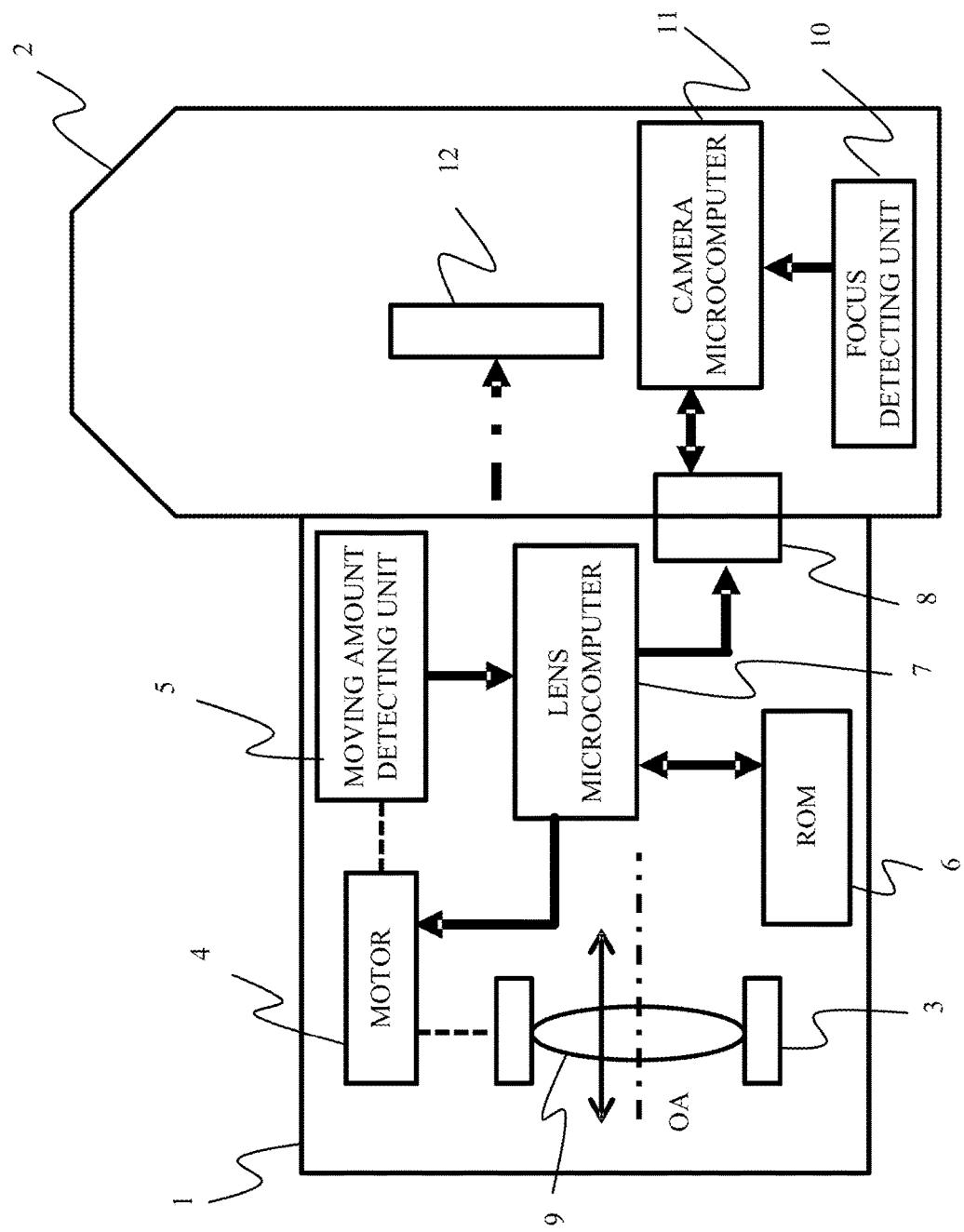
FIG. 15 is a block diagram of an image capturing apparatus according to the third embodiment.

FIG. 15 is a block diagram of an image capturing apparatus (interchangeable lens 1 and camera body 2) according to this embodiment, and schematically illustrates the configurations of the interchangeable lens 1 and the camera body 2. The interchangeable lens 1 (lens apparatus) is an interchangeable autofocus lens including a focus unit 3, a motor 4, a moving amount detecting unit 5, a nonvolatile ROM 6, a lens microcomputer 7, a contact unit 8, and a focus lens 9.

The focus unit 3 includes a holding unit that holds the focus lens 9 movable in a direction along the optical axis OA (optical axis direction) for focusing on the object. The motor 4 is an actuator that drives the focus unit 3. The moving amount detecting unit 5 is a detector that detects a rotating amount and a rotating speed of the motor 4, and can measure a moving amount of the focus unit 3. The ROM 7 is a rewritable nonvolatile memory (storage unit). The data stored in the nonvolatile ROM 6 is information indicative of an optical characteristic peculiar to the interchangeable lens 1, and the camera body 2 acquires this information from the interchangeable lens 1 and corrects the image captured based on this information.

The nonvolatile ROM 6 stores the information on the PSF, such as the coefficient data and the adjustment coefficient m necessary to reconstruct the PSF of the image capturing optical system, and transmits the information through communications from the interchangeable lens 1 to the camera body 2 via the contact unit 8. The camera body 2 generates the filter based on the information on the PSF sent from the interchangeable lens 1, executes the correction processing, and generates the sharpened image.

The lens microcomputer 7 is a lens controller that controls each component in the interchangeable lens 1. The lens microcomputer 7 serves as a communication circuit (unit) for communications between the interchangeable lens 1 and the camera body 2, a reset exception processor, an A/D converter, a timer, an input/output port, an internal ROM, an internal RAM, and the like. The communication circuit provides a communication with a communication method between the interchangeable lens 1 and the camera body 2, containing the control information according to an image capturing mode (such as a motion image capturing mode and a still image capturing mode). The lens microcomputer 7 controls driving the optical elements, such as a lens and an aperture stop, based on control information obtained via the communication circuit. The contact unit 8 includes a connector that has a plurality of metallic contacts for communications between the interchangeable lens 1 and the camera body 2 and for electric connections between the lens microcomputer 7 and the camera microcomputer 11.

The camera body 2 (image capturing apparatus body) includes a focus detecting unit 10, the camera microcomputer 11, and the image sensor 12, such as a CMOS sensor and a CCD sensor. The focus detecting unit 10 measures a shift amount of the current position of the focus unit 3 on the film plane from a distance to the object. The autofocus description is irrelevant to the purport of this embodiment, and a description thereof will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-076171, filed on Apr. 6, 2017 which is hereby incorporated by reference herein in its entirety.

What is claimed is:

1. An image processing method comprising:
acquiring a captured image generated through image capturing using an optical system;
acquiring a point spread function of the optical system corresponding to an image capturing condition of the captured image;
performing first shaping processing so as to reduce a difference between a maximum value and a non-maximum value for data generated using information of the acquired point spread function;
performing rotating processing according to a position of the captured image for the data generated using information of the acquired point spread function, after performing the first shaping processing; and
performing sharpening processing of the captured image using the data generated using information of the acquired point spread function, after the rotating processing.

2. The image processing method according to claim 1, wherein the sharpening processing includes performing unsharp mask processing for the captured image using the data after the rotating processing.

3. The image processing method according to claim 1, wherein the data has a rotationally asymmetrical distribution.

4. The image processing method according to claim 1, wherein the first shaping processing includes performing shaping processing for the maximum value of the data.

5. The image processing method according to claim 4, wherein the first shaping processing includes performing shaping processing for the data so as to reduce the maximum value of the data.

6. The image processing method according to claim 1, wherein the first shaping processing includes performing the shaping processing for the data so as to increase the non-maximum value of the data.

7. The image processing method according to claim 1, further comprising performing second shaping processing so as to increase a difference between the maximum value and the non-maximum value of the data for the data after the rotating processing,
wherein the sharpening processing includes the step of performing the sharpening processing for the captured image by using the data after the second shaping processing.

8. The image processing method according to claim 7, wherein the second shaping processing includes adjusting a coefficient of the data after the first shaping processing.

9. The image processing method according to claim 7, wherein the second shaping processing includes performing shaping processing for the maximum value of the data.

10. The image processing method according to claim 7, wherein the second shaping processing includes performing shaping processing for the data so as to increase the maximum value of the data.

11. The image processing method according to claim 7, wherein the second shaping processing includes performing shaping processing for the data so as to decrease the non-maximum value of the data.

12. The image processing method according to claim 7, wherein the sharpening processing includes applying a window function for the data after the second shaping processing.

13. The image processing method according to claim 7, wherein the sharpening processing includes:
generating a sharpening filter using the data after the second shaping processing; and
sharpening the captured image through a convolution of the sharpening filter to the captured image.

14. The image processing method according to claim 13, wherein the sharpening filter is adjusted by an adjustment coefficient according to a position in the captured image.

15. The image processing method according to claim 7, wherein the sharpening processing includes:
generating a correction component using the data after the second shaping processing and the captured image; and
sharpening the captured image by adding the correction component to or subtracting the correction component from the captured image.

16. The image processing method according to claim 15, wherein the correction component is adjusted by an adjustment coefficient according to a position in the captured image.

17. The image processing method according to claim 1, wherein the image capturing condition includes at least one of an image height, a focal length, an F-number, and an image capturing distance.

18. The image processing method according to claim 1, further comprising:
acquiring coefficient data of a predetermined function; and
reconstructing the data by using the coefficient data.

19. An image processing apparatus comprising:
a first acquirer configured to acquire a captured image generated through image capturing using an optical system;
a second acquirer configured to acquire a point spread function of the optical system corresponding to an image capturing condition of the captured image;
a shaping processor configured to perform first shaping processing so as to reduce a difference between a maximum value and a non-maximum value for data generated using information of a point spread function of the acquired point spread function;
a rotation processor configured to perform rotating processing according to a position of the captured image for the data generated using information of the acquired point spread function, after performing the first shaping processing; and
a sharpening processor configured to perform sharpening processing of the captured image using the data generated using information of the acquired point spread function, after the rotating processing.

20. An image capturing apparatus comprising:
an image sensor configured to output image data by photoelectrically converting an object image formed via an optical system; and
an image processing apparatus according to claim 19, wherein the first acquirer of the image processing apparatus acquires the image data as a captured image.

21. A non-transitory computer-readable recording medium storing a program that enables a computer to execute an image processing method that includes:
acquiring a captured image generated through image capturing using an optical system;
acquiring a point spread function of the optical system corresponding to an image capturing condition of the captured image;
performing first shaping processing so as to reduce a difference between a maximum value and a non-maximum value for data generated using information of the acquired point spread function;
performing rotating processing according to a position of the captured image for the data generated using information of the acquired point spread function, after performing the first shaping processing; and
performing sharpening processing of the captured image using the data generated using information of the acquired point spread function, after the rotating processing.

* * * * *